(12) United States Patent
Dwarakanath et al.

(10) Patent No.: US 8,370,194 B2
(45) Date of Patent: *Feb. 5, 2013

(54) ROBUST FORECASTING TECHNIQUES WITH REDUCED SENSITIVITY TO ANOMALOUS DATA

(75) Inventors: Samvid H. Dwarakanath, Seattle, WA (US); Monty VanderBilt, Seattle, WA (US); John M. Zook, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 373 days.

This patent is subject to a terminal disclaimer.

(21) Appl. No.: 12/726,188

(22) Filed: Mar. 17, 2010

(65) Prior Publication Data

US 2010/0185499 A1    Jul. 22, 2010

Related U.S. Application Data

(63) Continuation of application No. 11/089,537, filed on Mar. 24, 2005, now Pat. No. 7,739,143.

(51) Int. Cl.
    G06F 9/46         (2006.01)
(52) U.S. Cl. .................................................. 705/7.37
(58) Field of Classification Search .................. 705/7.37
    See application file for complete search history.

(56) References Cited

U.S. PATENT DOCUMENTS

| | | | |
|---|---|---|---|
| 5,659,593 A | 8/1997 | Tzvieli | |
| 5,841,946 A | 11/1998 | Naito et al. | |
| 6,032,145 A | 2/2000 | Beall et al. | |
| 6,549,919 B2 | 4/2003 | Lambert et al. | |
| 6,594,528 B1 | 7/2003 | Hirano | |
| 6,625,569 B2 | 9/2003 | James et al. | |
| 6,714,918 B2 | 3/2004 | Hillmer et al. | |
| 6,738,811 B1 | 5/2004 | Liang | |
| 6,834,266 B2 | 12/2004 | Kumar et al. | |
| 6,882,940 B2 | 4/2005 | Potts et al. | |
| 6,910,017 B1 | 6/2005 | Woo et al. | |
| 6,944,599 B1 | 9/2005 | Vogel et al. | |
| 7,092,929 B1 | 8/2006 | Dvorak et al. | |
| 7,197,474 B1 | 3/2007 | Kitts | |
| 7,233,933 B2 * | 6/2007 | Horvitz et al. | 706/21 |
| 7,251,589 B1 | 7/2007 | Crowe et al. | |
| 7,310,590 B1 | 12/2007 | Bansal | |
| 7,437,308 B2 | 10/2008 | Kumar et al. | |
| 7,523,047 B1 | 4/2009 | Neal et al. | |
| 7,574,382 B1 | 8/2009 | Hubert | |
| 7,584,116 B2 * | 9/2009 | Kakouros et al. | 705/7.31 |
| 7,610,214 B1 | 10/2009 | Dwarakanath et al. | |
| 7,689,521 B2 * | 3/2010 | Nodelman et al. | 706/21 |

(Continued)

OTHER PUBLICATIONS

Webby (Judgemental and statistical time series forecasting: a review of the literature), Dec. 1996, International Journal of Forecasting, pp. 91-118.*

(Continued)

*Primary Examiner* — Romain Jeanty
(74) *Attorney, Agent, or Firm* — Knobbe, Martens, Olson & Bear, LLP

(57) ABSTRACT

Robust forecasting techniques are relatively immune from anomalies or outliers in observed data, such as a stream of data values reflective of the operation or use of a computer system. One robust technique provides a relatively accurate forecast of seasonal behavior even in the presence of an anomaly in corresponding historical data. Another robust forecasting technique provides a relatively accurate forecast even in the presence of an anomaly that spans multiple recent observations. In one embodiment, both techniques are used in combination to automatically detect anomalies in the operation and/or use of a multi-user computer system.

26 Claims, 10 Drawing Sheets

U.S. PATENT DOCUMENTS

| | | | |
|---|---|---|---|
| 7,739,143 | B1 | 6/2010 | Dwarakanath et al. |
| 2001/0014868 | A1 | 8/2001 | Herz et al. |
| 2001/0049690 | A1 | 12/2001 | McConnell et al. |
| 2002/0099597 | A1 | 7/2002 | Gamage et al. |
| 2002/0106709 | A1 | 8/2002 | Potts et al. |
| 2002/0147630 | A1 | 10/2002 | Rose et al. |
| 2002/0161672 | A1 | 10/2002 | Banks et al. |
| 2002/0169657 | A1 | 11/2002 | Singh et al. |
| 2002/0178077 | A1 | 11/2002 | Katz et al. |
| 2003/0018928 | A1 | 1/2003 | James et al. |
| 2003/0033179 | A1 | 2/2003 | Katz et al. |
| 2003/0050859 | A1 | 3/2003 | Rodriguez et al. |
| 2003/0055714 | A1 | 3/2003 | Thompson et al. |
| 2003/0083956 | A1 | 5/2003 | Freeny, Jr. |
| 2003/0212590 | A1 | 11/2003 | Klingler |
| 2003/0212618 | A1 | 11/2003 | Keyes et al. |
| 2004/0088211 | A1 | 5/2004 | Kakouros et al. |
| 2005/0033683 | A1 | 2/2005 | Sacco et al. |
| 2005/0102175 | A1 | 5/2005 | Dudat et al. |
| 2005/0102192 | A1 | 5/2005 | Gerrits et al. |

OTHER PUBLICATIONS

Binkley, James K. and Connor, John M., "Grocery Market Pricing and the New Competitive Environment," Journal of Retailing, vol. 74, No. 2, Summer 1998.

Cheng Yang, et al., Efficient Discovery of Error-Tolerant Frequent Itemsets in High Dimensions, 2001, ACM Press.

Diebold, Francis X., "The Past, Present, and Future of Macroeconomic Forecasting" Journal of Economic Perspectives (IJEP), vol. 12, No. 2, pp. 175-192, Spring 1998.

Eammon J. Keogh & Michael J. Pazzani. "Relevance Feedback Retrieval of Time Series Data". 22nd International ACM-SIGIR Conference on Research and Development in Information Retrieval, 1999, pp. 183-190.

Eamonn J. Keogh & Michael J. Pazzani. "An Enhanced Representation of Time-Series which Allows Fast and Accurate Classification, Clustering and Relevance Feedback". Fourth Conference of Knowledge Discovery in Databases and Data Mining, 1998.

"Gymboree Enhances Price Management," Retail Systems Alert, vol. 13, No. 6, Jun. 2000.

Koloszyc, Ginger, "Merchants Try Complex Mathematical Tools to Improve Inventory Decisions", Stores Magazine, Nov. 1998, [retrieved Mar. 29, 2007], pp. 1-3.

Levy, Michael R. & Woo, Jonathan, Ph.D. "Yield Management in Retail: The Application of Advanced Mathematics to the Retail Pricing Dilemma," TSI (Marketing Materials), The Journal of Professional Pricing, pp. 23-26, 1999.

Makridakis, Spyros, et al., "Forecasting: Methods and Applications," 3rd edition, copyright 1998, John Wiley & Sons, Inc., pp. 312, 373-374.

Moira Cotlier. "Avoiding costly online errors," Catalog Age. New Canaan, CT, Sep. 2000. vol. 17, Issue 10.

Technology Strategy Inc. (TSI), TSI website pages, copyright 1999, in 18 pages.

Office Action dated Jun. 12, 2008 for U.S. Appl. No. 11/089,452.

Response to Office Action, submitted Oct. 14, 2008 for U.S. Appl. No. 11/089,452.

Final Office Action, dated Jan. 23, 2009, for U.S. Appl. No. 11/089,452.

Response to Final Office Action, dated Mar. 5, 2009, for U.S. Appl. No. 11/089,452.

Advisory Action, dated Mar. 18, 2009, for U.S. Appl. No. 11/089,452.

Pre-Appeal Brief Request for Review, dated Apr. 22, 2009, for U.S. Appl. No. 11/089,452.

Notice of Appeal, dated Apr. 22, 2009, for U.S. Appl. No. 11/089,452.

Notice of Panel Decision From Pre-Appeal Brief Review for U.S. Appl. No. 11/089,452, dated May 28, 2009.

Notice of Allowance for U.S. Appl. No. 11/089,452, dated Sep. 1, 2009.

Supplemental Notice of Allowability, dated Sep. 15, 2009, for U.S. Appl. No. 11/089,452.

Issue Fee Payment for U.S. Appl. No. 11/089,452, dated Sep. 15, 2009.

Office Action dated Aug. 27, 2009 for U.S. Appl. No. 11/089,537.

Response to Office Action, submitted Sep. 17, 2009, for U.S. Appl. No. 11/089,537.

Notice of Allowance for U.S. Appl. No. 11/089,537, dated Feb. 3, 2010.

* cited by examiner

ROBUST FORECASTING TECHNIQUES WITH REDUCED SENSITIVITY TO ANOMALOUS DATA

RELATED APPLICATIONS

This application is a continuation of U.S. patent application Ser. No. 11/089,537, filed Mar. 24, 2005, titled ROBUST FORECASTING TECHNIQUES WITH REDUCED SENSITIVITY TO ANOMALOUS DATA, now U.S. Pat. No. 7,739,143, the entirety of which is hereby incorporated by reference. This application is related to U.S. patent application Ser. No. 11/089,452, filed Mar. 24, 2005, titled ROBUST FORECASTING TECHNIQUES WITH REDUCED SENSITIVITY TO ANOMALOUS DATA, now U.S. Pat. No. 7,610,214, the entirety of which is hereby incorporated by reference.

BACKGROUND

1. Field of the Invention

The invention generally relates to the monitoring of a computer-based system, such as a web site system, to detect events or problems that may require a corrective action. More specifically, the invention relates to a methodology of monitoring such a system by computationally predicting the values of data representative of its normal operating conditions, and computationally evaluating observed values against predicted values in real time or near real time. In particular, the invention relates to improved prediction ("forecasting") methods for use in such a methodology.

2. Description of the Related Art

Techniques for forecasting are very useful in a number of applications. One such application involves the monitoring of a computer system, such as a web site system or an email system, to detect various types of problems associated with the operation or use of the system. For instance, a forecasting algorithm may be used to predict the server response times that will be experienced by users at a particular point in time. These predicted values may then be compared to actual response time values to evaluate whether the monitored system is functioning properly. Data corresponding to measurements of an "observable" over time are commonly referred to as a time series. Observables (e.g. server response time) that are useful in evaluating system health are commonly referred to as metrics.

Time series forecasting algorithms vary greatly in complexity. The simplest techniques forecast a single value. More sophisticated techniques forecast trend, seasonal cycles (periodic behavior), and combinations thereof. Some techniques ("robust techniques") mitigate the impact of isolated outliers in historical data on forecasts. While such techniques may isolate a single outlier in a historical data series, an abnormality in a monitored system may result in a relatively large number of consecutive data points corresponding to anomalous data. These anomalous data points are not effectively handled by conventional forecasting techniques.

One simple technique is an exponentially-weighted moving average ("exponential smoothing"); this technique forecasts a single value, calculated by averaging historical data with exponentially greater weight given to more recent observations. Such a technique, when applied to page latency (load time) associated with a web server, predicts latency by averaging historical data, giving more weight to more recent data.

Forecasting algorithms that account for trend are useful for metrics that exhibit growth or decay. For example, a web site with a steadily increasing user base will likely exhibit an increasing trend in the number of web pages requested per minute, and this trend should be exploited in forecasting the page request rate. One algorithm that predicts trend is an extension of the exponential smoothing technique commonly referred to as Holt-Winters.

Forecasting algorithms that account for seasonal variations are useful where the metric or activity being monitored tends to vary in a predictable manner over cyclical time periods or "seasons." For example, metrics associated with the load placed on a large scale server system will commonly vary over daily, weekly, and/or yearly cycles in response to customer behavior. One algorithm that predicts seasonal variations is an extension of the Holt-Winters technique commonly referred to as Holt-Winters Seasonal ("HWS").

Forecasting algorithms sometimes take advantage of techniques intended to discard outliers in the observed data. For example, a 911 call answer time metric is likely to be quite stable but may have infrequent anomalies. One approach to discarding such outliers is control charting. It is typical for robust techniques to be ineffective when an anomaly spans several successive observations or when an anomaly is present in the most recent observation(s).

One problem with existing forecasting methods, including those that account for seasonal variations, is that they commonly produce inaccurate results for a period of time after an anomaly occurs. For example, an anomalous event in the operation of a computer system, such as a server failure or denial of service (DoS) attack, will typically result in one or more anomalous data values in the time series of a representative metric; additionally, during the time of failure, these data points will typically be the most recent available observations. As described in the foregoing, typical outlier removal methods are not effective in this situation. Methods such as exponential smoothing will perform poorly between the start of the event until well after the event has subsided due to the influence of anomalous data. Seasonal forecasting algorithms may produce poor forecasts for several cycles (e.g., days, weeks or years); HWS typically does not completely recover within a meaningful time scale. As a result, the forecasting-based monitoring system may both fail to accurately detect problems that require attention and yield unacceptably numerous false alarms.

Another problem with the relatively more complex conventional forecasting methods is that they are typically computationally intensive. Robust spline fitting and robust LOESS, which provide some improvement in outlier mitigation, are two examples of such methods. Real-time monitoring of a complex computer system such as a web site requires timely anomaly detection (often one to five minutes) and involves processing of many concurrent metrics (hundreds or thousands), vitiating the utility of such computationally intensive methods.

SUMMARY

Robust forecasting methods and algorithms are disclosed which are relatively immune from anomalies or outliers in a stream or time series of observed data values. These forecasting methods, which may be implemented in software and/or hardware of a computer-based monitoring system, improve the accuracy of forecasts for a wide variety of applications, such as in the detection of anomalies in the operation or use of a computer system. The forecasting methods are sufficiently computationally efficient to enable concurrent monitoring of a large number of data streams (which may be associated with a common metric or different metrics) in real time.

One robust technique provides a relatively accurate forecast of seasonal effects even in the presence of an anomaly in historical data. In contrast to methods using exponential smoothing of entire collections of data, the seasonal profile is derived from a predetermined number of past seasons to ensure that an anomaly will eventually be fully purged. In one embodiment, the predetermined number is a fixed number. Seasonal profiles are calculated for each of these past seasons, and are merged in a manner that effectively excludes anomalies. In one embodiment, the seasonal profile for a season of s observations is comprised of s seasonality factors $I_n$. In one embodiment, a seasonality factor $I_n$ corresponds to the fluctuation of the observation over an average value, such as an exponentially-weighted moving average, of the season. For example, the average value during the season, when multiplied by I(t), yields the t-th observed value of the season. In one illustrated embodiment, 5 prior seasonal profiles of this type are maintained and are merged factor-by-factor; the high and the low values are discarded, and the remaining values are combined in a weighted average with the median value having the most weight. The resulting seasonal profile is utilized to generate a seasonality-inclusive forecast at time t+x, where x corresponds to a forecast time horizon.

One robust technique generates a forecast for a time t+x from a time t by computing seasonal adjustment factors for the time t+x and the time t that are representative of the normal operating condition of a monitored system. For example, one embodiment of the technique obtains a plurality of seasonality factors, such as a predetermined number, for example, several, for each of the time t+x and the time t. These seasonality factors can be retrieved from a computer-readable medium, computed from past observations, and the like. The plurality of seasonality factors are used in such a way that the resulting seasonal adjustment factor is representative of a seasonal adjustment factor for the normal operating condition of the monitored system. In one example, the most representative seasonality factors are selected from the plurality of seasonality factors to generate a seasonal adjustment factor. Other applicable techniques include unequally weighted averaging based on relative values among the seasonality factors, capping of data values based at least partially on relative values among the seasonality factors, selection of a median value, or any combination thereof.

One robust forecasting technique provides a relatively accurate forecast even in the presence of an anomaly in a recent observation. A plurality of forecasts are made for the forecast at time t+x. These forecasts include a forecast based on observations until time t and one or more forecasts based on observations until other cutoffs, such as at times t−m and t−2m. A forecast is generated based on a selected one of, or combinations of, the forecasts for the forecast at time t+x. In one embodiment, the median of these forecasts is selected as the forecast to use for the forecast at time t+x.

One robust technique generates a forecast for a time t+x from multiple independent forecasts generated using observations taken up to multiple different times. For example, a first forecast for the time t+x is generated from data observed up to a time t. At least a second forecast for the time t+x is generated from data observed up to a time t−m, which is earlier in time than the time t. The time interval m is selected to be at least as long as the length of time that an abnormality in a monitored system is expected to last. In one embodiment, when the forecast for the time t+x is presented, the multiple independent forecasts are used in such a way that a resulting single forecast uses data and generates a forecast representative of the normal operational state of the monitored system even when anomalous data is present in the recently observed data. Applicable techniques include, for example, unequally weighted averaging based on relative values among the independent forecasts, capping of data values, the selection of a median value, or any combination thereof. This provides the technique with a relatively high probability that at least one of the multiple independent forecasts is based primarily on data representative of normal operation such that the presented forecast is representative of normal operation.

In one embodiment, a plurality of the above techniques are combined to provide a robust forecast suitable for use in monitoring a computer system. These robust forecasts can be used to detect various types of faults and anomalies associated with a monitored system such that corrective actions can be taken in a timely manner.

BRIEF DESCRIPTION OF THE DRAWINGS

These drawings and the associated description herein are provided to illustrate embodiments of the invention, and are not intended to be limiting.

DETAILED DESCRIPTION OF SPECIFIC EMBODIMENTS

Figure 1A:
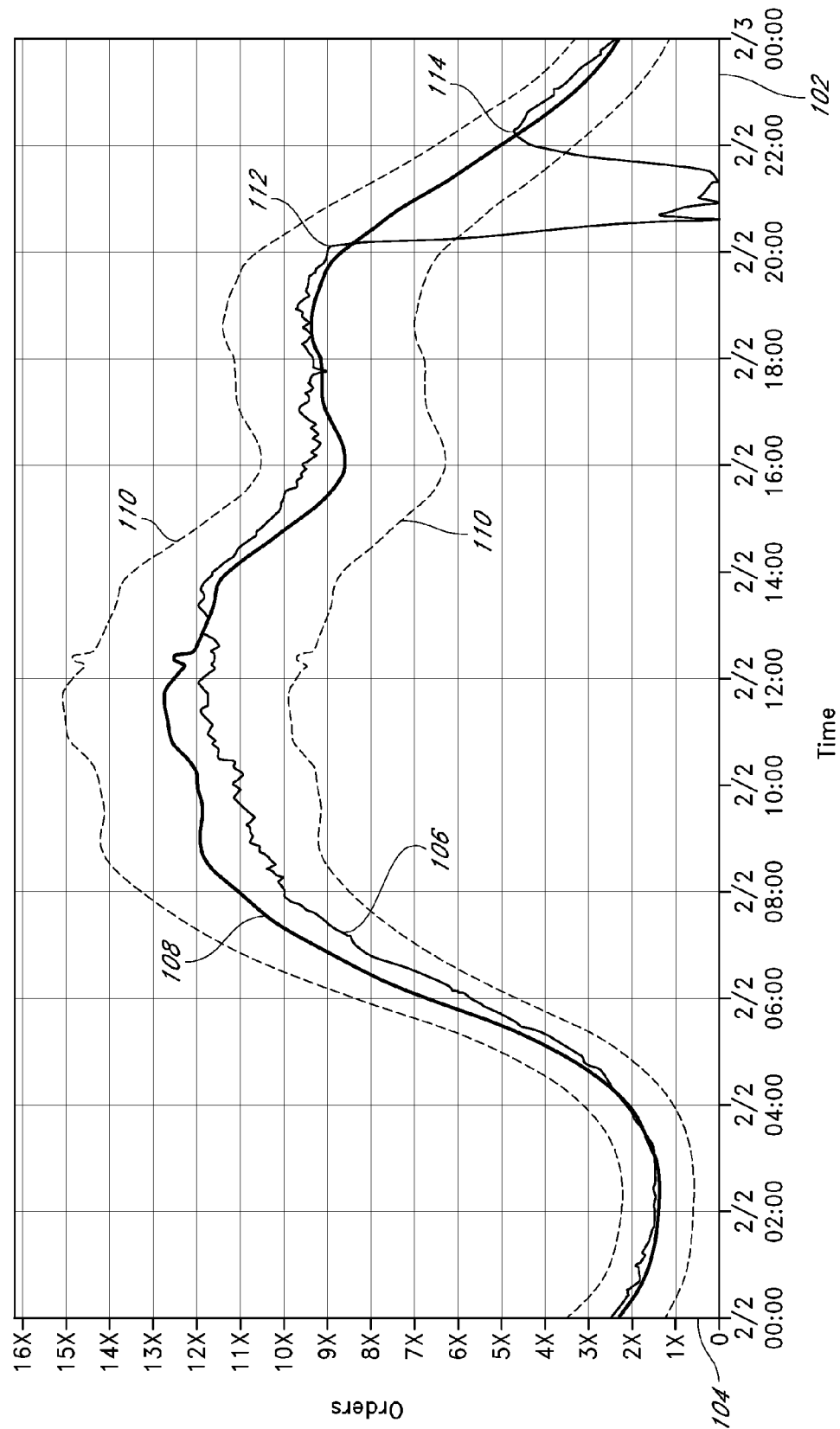
FIG. 1A illustrates a chart of actual data and a forecast with the data accumulated in 5-minute intervals.

Although particular embodiments are described herein, other embodiments, including embodiments that do not provide all of the benefits and features set forth herein, will be apparent to those of ordinary skill in the art.

The present invention contemplates forecasting systems and methods that are relatively immune to anomalies or outliers in observed data, such as a time series of metric data values. One robust technique provides a relatively accurate forecast even in the presence of one or more anomalies in related seasonal data. Another robust forecasting technique provides a relatively accurate forecast even in the presence of one or more anomalies in recent observations. In one embodiment, both techniques are combined to provide an even more robust forecast. Advantageously, these robust forecasting techniques make it practical to use forecasts in a wide variety of applications.

The forecasting systems and methods described herein can be implemented in a variety of ways, such as by dedicated hardware, by software executed by a microprocessor or a general purpose computer system, or by a combination of both dedicated hardware and software. In addition, the disclosed systems and methods can be used for a wide range of forecasting applications. In one embodiment, the disclosed forecasting methods are embodied in software executed by a general purpose computer system, and are used to monitor the operation of a multi-user server system. Although the disclosed forecasting methods are typically implemented in real time or near-real-time as new data values become available, they may be implemented in a non-real-time or batch mode. One embodiment includes a computer-readable medium having stored thereon a set of program modules that, when executed by a computer, cause the computer to perform the forecasting method.

The forecasting methods may be used to monitor and detect anomalies in a wide range of different parameters or metrics associated with a computer system. For example, in the context of a server system, such as web site system, that provides functionality for users to purchase items (products, services, stocks, subscriptions, etc.), the forecasting methods may be used to monitor and forecast one or more of the following: page latency, server response time, item order rate, item price, item popularity, system load. In some cases, many data streams associated with the same type of metric may be analyzed concurrently. For example, in the context of a large electronic catalog of items, the order rate of each item in the catalog (or a selected subset of such items) may be analyzed and forecast independently of other items in the catalog, such that item-specific anomalies (e.g., erroneous item price data) may be detected. In another example, the forecasting methods can be used to monitor and detect a data processing error or a data processing slowdown by, for example, monitoring and forecasting processing operations per unit time. In one embodiment, a detection of an abnormality is used to initiate an automated corrective procedure, such as a load balancing program or protocol, a server reconfiguration process, and the like.

The disclosed forecasting methods may also be used to monitor a wide range of low-level metrics reflective of the health of the server system, including metrics that are accessible through standard operating system and application APIs (Application Program Interfaces). Examples of such metrics include CPU utilization, available disk space, available RAM space, number of processes running, thread count, and system call rate. The forecasting methods may also be used to forecast various other types of metrics and conditions, such as telephone network traffic, vehicle traffic, hotel occupancy, and energy usage.

As mentioned above, conventional forecasting techniques are susceptible to inaccuracies due to anomalies and are of limited use in many applications. Such problems have limited the applicability of forecasting techniques. For example, when a result of a forecast is used to detect a fault or other mode that typically requires corrective action, it is relatively important not to generate false alarms. In addition, where, for example, the forecast measures system performance, the forecast should reflect how the system should perform under normal conditions rather than how the system should perform in an anomalous state. A forecasting technique that is relatively immune to anomalies can provide useful forecasts for automatically detecting faults or anomalies that require corrective action. In the case of a monitored computer system, the corrective action may, for example, involve reconfiguring or rebooting a server, or correcting erroneous data displayed on a web site.

To detect anomalies associated with a monitored system, the forecasted data values are compared to corresponding actual or "observed" data values. For example, the forecasts can be used to establish an expected range in which an observation is expected to fall. In another example, the forecast can be compared directly to the corresponding observation, and the difference can be compared to a predetermined value, such as a percentage. Detected anomalies may be automatically reported to appropriate personnel, and/or may be used to automatically take corrective actions.

Figure 1B:
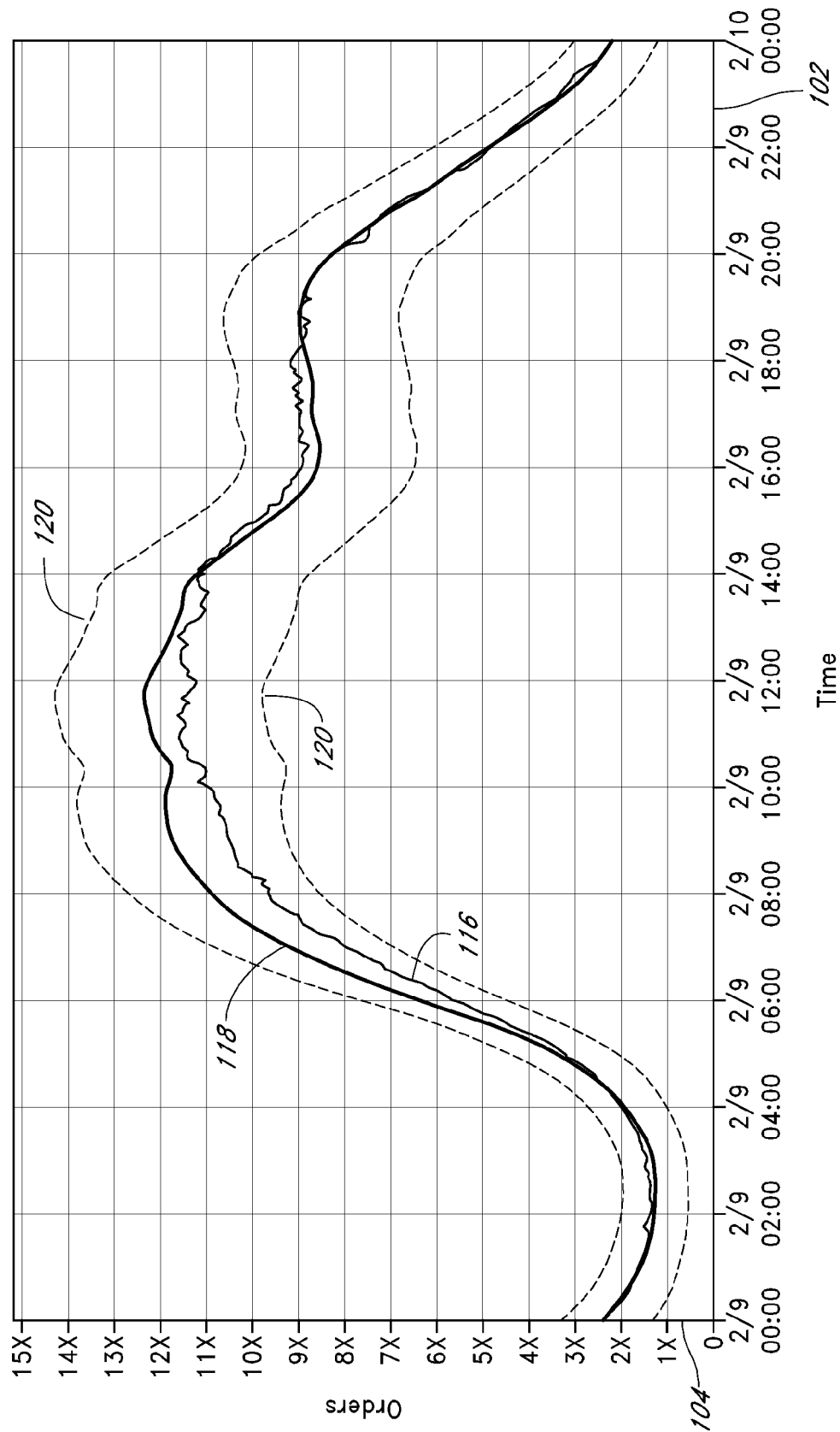
FIG. 1B extends FIG. 1A for the period one week after.

Example Control Charts (FIGS. 1A and 1B)

FIG. 1A illustrates a control chart based on actual data of actual and forecasted rates at which orders are received by a web site system. The orders are for products that are represented in an electronic catalog hosted by the web site system, and the orders are placed by web site users. The curves shown in FIG. 1A correspond to data values collected and processed by a monitoring system that monitors one or more metrics (such as order rate) associated with the web site system.

For online sales of products, weekly seasonality (periodic behavior) in the order rate metric is expected. Thus, for example, a forecast for the rate of orders placed at 2:00 PM for a Wednesday can be expected to exhibit similar periodic behavior to the rate of orders placed at 2:00 PM on another Wednesday. It will be understood that the seasonal period will vary depending on the particular metric being forecasted, and that the appropriate seasonal period to use will be readily determined by one of ordinary skill in the art.

The horizontal axis 102 in FIG. 1A represents time in hours for February 2. The vertical axis 104 indicates a scale for the number of orders received in a time interval, such as per 5 minute period. In the example illustrated in FIG. 1A, the raw data used corresponds to the number of sales orders accumulated in 5-minute intervals. In this example, the raw data stream is further processed to create a smoothed data stream, and the smoothed data stream is used as the observation data for forecasting and for comparisons to forecasts. The smoothing of the raw data before using the data for forecasting can be advantageous where the raw data is erratic. The desirability of pre-processing the raw data, and the type of conversion processing (if any) performed, typically depends on the type of metric or condition being monitored. In the illustrated example of FIG. 1A, the raw data is square rooted to yield an approximately constant variance, then converted to frequency domain, then low-pass filtered in frequency domain, and then converted back to time domain. The forecast is generated based on the square-rooted and low-pass filtered data, and the corresponding data for the illustrated curves are squared for display on the chart.

The first solid curve 106 in FIG. 1A corresponds to the smoothed order rate data. The thicker solid curve 108 corresponds to the forecasted order rate. Algorithms for generating these forecasts will be described later in connection with FIGS. 3 and 4. The observations used to generate the forecasts can correspond to a wide variety of data, and in the illustrated embodiment, correspond to the square root of the smoothed data. It will be understood that the observations can also correspond to other data, such as to the raw data or to smoothed data.

In this particular example, the horizontal axis 102 corresponds to Pacific Standard Time. As illustrated, this web site system received a relatively large number of orders in the morning and in the afternoon, e.g., about 12× orders per 5 minutes at 12:00 noon (where X is a constant scaling factor). The chart also reveals that the web site system received a relatively small number of orders at around 2:00 AM.

Error bars illustrated as dashed lines 110 represent expected or tolerated ranges for the observations. Abnormalities are identified when the order data, such as the smoothed order data corresponding to the first curve 106, falls outside the ranges. The error bars may, for example, be specified as predetermined percentage offsets, predetermined fixed amounts, or a combination of both percentages and fixed amounts from the forecast. Other applicable specifications for identifying abnormalities will be readily determined by one of ordinary skill in the art. For example, the abnormalities may also be specified in terms of standard deviations, with the standard deviation calculated by comparing historical observations against historical predictions. For some metrics, an abnormality may be reported only when the observed data is higher than expected, or only when the observed data is lower than expected.

Dashed lines 110 in FIG. 1A correspond to error bars above and below the forecast curve for expected ranges for the observations. In the illustrated embodiment, these error bars were set to about ±20% around the forecast. Of course, appropriate limits for expected ranges will typically vary depending on the characteristics of the metric monitored, how quickly faults are desired to be detected, how many false alarms are to be tolerated, and the like, and will be readily determined by one of ordinary skill in the art.

FIG. 1A illustrates a region starting at around 20:00 or 8:00 PM 112 and ending at about 22:00 or 10:00 PM 114, where the number of orders unexpectedly fell. In the illustrated example, an abnormality is detected at about 20:15 or 8:15 PM when the smoothed order rate data illustrated by the first solid line 106 falls below the lower error bar threshold illustrated by the lower dashed line 110.

The detection of observations falling outside an expected range can be used to trigger an alert and/or to initiate a corrective action. For instance, an unexpectedly low order rate associated with the items sold by a particular merchant partner may be reported by an automated email message to personnel responsible for the associated partition of the electronic catalog. In the case of low level "system health" metrics such as CPU utilization and available disk space, detected anomalies may be reported to IT personnel. For example, the alert messages may be sent by email, pager, instant messaging, and/or other communications methods. In one embodiment, the alert message includes a hyperlink to a chart of the actual data and the forecast, such as the chart illustrated in FIG. 1A.

As can be observed from FIG. 1A, the forecast represented by the first solid curve 106 remains relatively unperturbed by the anomaly during the anomaly (time period between 8:00 PM 112 and 10:00 PM 114) and afterward. FIG. 1B, which will be described later, illustrates a forecast a week into the future can remain unperturbed to the presence of the anomaly when the anomaly has drifted back in time such that it is present in the seasonal data.

The display shown in FIG. 1A illustrates forecasts in 5-minute intervals and corresponding accumulated data. Of course, other intervals can be used. For example, to save processing power, the forecast intervals can be longer than intervals used to measure order rates and compare to forecasted order rates. For example, in the illustrated system, the forecasts are made in 5 minute intervals and the system monitors for errors in 1 minute intervals. In the illustrated embodiment, the observations are accumulated in 1-minute intervals, the forecasts are made in 5-minute intervals, and the forecasts are interpolated between the forecast intervals to provide corresponding estimates for the observations. If the order rates shown in FIG. 1A are for a particular product represented in the web site's catalog, an abnormally high order rate may, for example, indicate the wrong price (one that is too low) has erroneous been uploaded to the web site, resulting in anomalous order activity by users. If the order rates represent all orders received by the web site system, a detected anomaly may, for example, represent a site-wide problem, such as a malfunctioning server or service. Although the data illustrated in FIG. 1A corresponds to a particular metric (namely order rate), the underlying forecasting and anomaly detection methods are applicable to numerous other metrics.

In the next example illustrated by FIG. 1B, the same metric (order rates) from the same monitored system is monitored a season later (a week later). The horizontal axis 102 indicates a time scale in hours for February 9. The vertical axis 104 indicates a scale for the number of orders received in a 5-minute interval. A first curve 116 corresponds to smoothed data, e.g., smoothed orders per 5-minute interval. A second curve 118 corresponds to the forecast. As can be observed in FIG. 1B, the forecast as illustrated by the second curve 118 for February 9 from about 20:00 or 8:00 PM to about 22:00 or 10:00 PM relatively accurately predicts the smoothed data 116 despite the anomalies encountered in the prior season's data illustrated in the corresponding time period in FIG. 1A. Units of measurement other than those depicted in FIGS. 1A and 1B may alternatively be used.

While the forecasts can also be generated with the same interval as are the observations, different intervals may be purposely selected. For example, in the illustrated embodiment, the forecasts are made in 5-minute intervals rather than 1-minute intervals because, for the particular product or products involved, 5-minute intervals are sufficiently accurate and reduce memory consumption by 80% (1 data point vs. 5). The appropriate forecast interval to use in a particular application will be readily determined by one of ordinary skill in the art.

Although charts of the type shown in FIGS. 1A and 1B need not actually be generated for display, their availability to personnel may be helpful to ascertaining the severity of a detected problem. Thus, for example, when the monitoring system generates an alert message by email, it may include in the email an associated chart, and/or a link to such a chart.

Figure 1C:
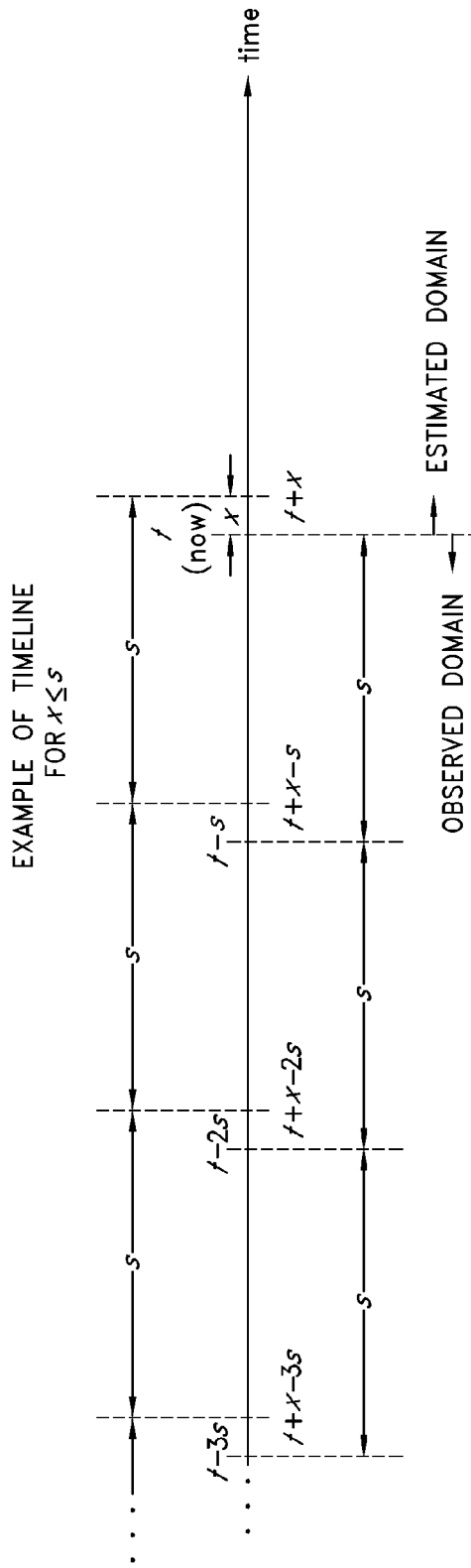
FIG. 1C is a timing diagram illustrating seasonal periods for deseasonalizing a current observation at time t and seasonalizing a forecast for a time t+x, where the forecast time horizon x is less than or equal to a seasonal period s.
Figure 1D:
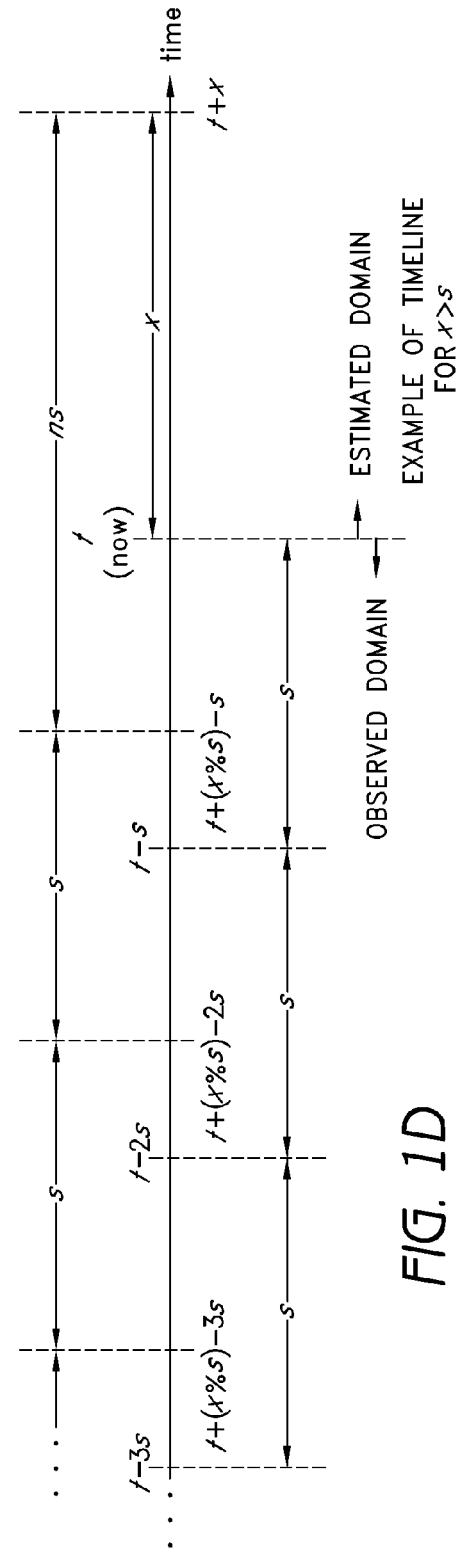
FIG. 1D is a timing diagram illustrating seasonal periods for deseasonalizing a current observation at time t and seasonalizing a forecast for a time t+x, where the forecast time horizon x is greater than a seasonal period s. The symbol "%" indicates the modulo operator.
Figure 1E:
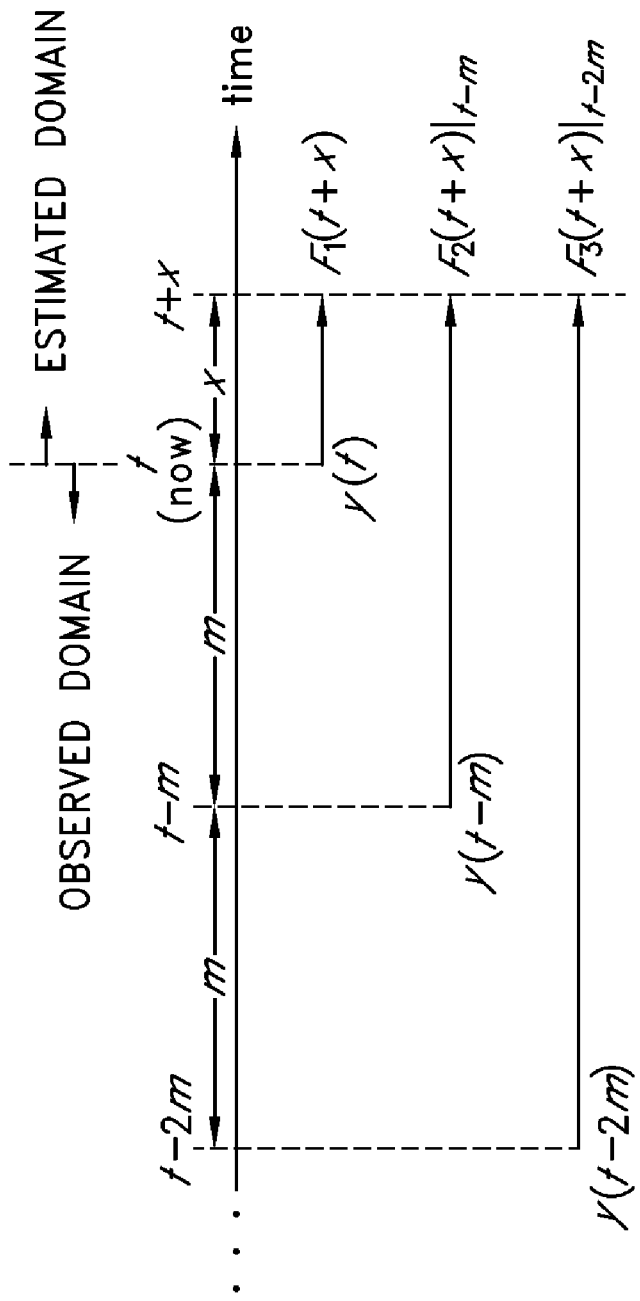
FIG. 1E illustrates an example of a timing diagram describing making multiple forecasts for a time t+x using one or more observations (directly or indirectly) up to and including a current observation time t for a first forecast $F_1$ and using one or more other forecasts (e.g., $F_2$ and $F_3$) generated from less than all of the available observations in the observed domain.

Example Timing Diagrams (FIGS. 1C, 1D, and 1E)

FIG. 1C is a timing diagram illustrating seasonal periods used to account for seasonality (deseasonalize) a current observation at time t and to adjust for seasonality (seasonalize) a forecast for a time t+x, where the forecast time horizon x is less than or equal to a seasonal period s. An example described later in connection with FIG. 1D illustrates seasonal periods where the forecast time horizon x is greater than the length of a seasonal period s. The illustrated timing diagrams may be helpful in illustrating features of a process that will be described in greater detail later in connection with FIG. 3.

A horizontal axis indicates time, with time increasing to the right. A dashed vertical line at present time t (now) corresponds to the most recent in time observation in use by the forecasting process. As illustrated in FIG. 1C, the dashed vertical line at present time t demarcates a domain to the left in which observations are available, and a domain to the right in which one or more forecasts are estimated. In a real time system, the time t typically corresponds to the most recent observation available. It should be noted that time t corresponds to a time from which a forecast is being generated, and that this time t can be the present time or can be a time in the past. For example, it will be understood that when a forecasting process is initially started, it is typically started with some initialization data and runs through ("trained on") accumulated data until it reaches the present time.

The forecast time horizon x corresponds to the time into the future from the time t for which a forecast at time t+x is made. The forecast time horizon x can be any amount of time. In the example illustrated in FIG. 1C, the forecast time horizon x is less than or equal to the length of a seasonal period s. An example of a time period for the forecast time horizon x is 2 hours, and a time period for the seasonal period s is one week. It will be understood that the seasonal period s should be selected according to the characteristics of the observed data so that data or observations that are spaced an integer multiple of seasonal periods s apart exhibit periodic behavior. In addition, it should be noted that the seasonal period s itself may need to be adjusted according to changes to time, such as with the effects of daylight savings time, as applicable.

In an online sales of products example, a seasonality or seasonal periodicity of one week has been observed. Accordingly, prior observations at the corresponding point a week or integer multiple of a week earlier in time can be expected to exhibit the same or similar periodic behavior. For example, the observations at times t, t−s, t−2s, t−3s, and the like, can be expected to exhibit the same or similar seasonality. Accordingly, the observations from earlier times periodic to the present time t can be used to adjust for the seasonality in the observation y(t) at time t. For example, the present time t can correspond to 8:00 AM on a Wednesday morning, the time t+x can correspond to 10:00 AM later in the Wednesday morning, and the time t−s can correspond to 8:00 AM from the Wednesday morning of the previous week.

Seasonality (periodic behavior) is also used in the forecast for the time t+x. For example, the observations encountered at the corresponding points in time from earlier weeks should exhibit periodic behavior that is expected for the time t+x. Accordingly, observations or data computed from these observations from corresponding times of earlier seasons, such as the illustrated times t+x−s, t+x−2s, t+x−3s, and the like, can be used to compute an adjustment factor for the expected seasonality of the forecast at the time t+x. As will be described later, a problem can arise when one or more anomalies occurred in prior observations, which are then used in the generation of a forecast.

FIG. 1D is a timing diagram illustrating seasonal periods to account for seasonality (deseasonalize) a current observation at time t and to adjust for seasonality (seasonalize) a forecast for a time t+x, where the forecast time horizon x is greater than a seasonal period s. The forecast time horizon x can be any length of time. For example, where the seasonal period s corresponds to a week, the forecast time horizon x can correspond to 10 days. A horizontal axis indicates time, with time increasing to the right.

As described earlier in connection with FIG. 1C, the observation y(t) from time t can be expected to exhibit periodic behavior in common with the observations at times t−s, t−2s, t−3s, and the like. However, when the forecast time horizon x is greater than the seasonal period s, the time t+x s is not within the observed domain, so that in a real-time system, the corresponding observation is not available. Accordingly, the most recent observation that exhibits the same periodic behavior with the forecast at the time t+x is more than one season away, illustrated as ns, where n is an integer greater than one.

To select the proper observations or proper seasonality factors to generate the adjustment factor for seasonality, modular arithmetic can be used. In FIG. 1D, the modulo operator is indicated by the "%" symbol. Accordingly, observations from corresponding times of earlier seasons that are in the observed domain, such as the illustrated times t+(x % s)−s, t+(x % s)−2s, t+(x % s)−3s, and the like, can be used to compute an adjustment factor for the expected seasonality of the forecast at the time t+x. It will be understood that such modular arithmetic can be used for a forecast time horizon x of any value, whether less than or equal to or greater than the seasonal period s.

FIG. 1E illustrates an example of a timing diagram describing making multiple forecasts for a time t+x using one or more observations (directly or indirectly) up to and including a current observation time t for a first forecast $F_1$ and using one or more forecasts (e.g., $F_2$ and $F_3$) generated from less than all of the available observations in the observed domain. This permits forecasts for the same forecast time t+x to be generated, where at least some of the forecasts are likely to be based on observations that do not include an anomaly. The illustrated timing diagram may be helpful in illustrating features of a process that will be described in greater detail later in connection with FIG. 4. A horizontal axis indicates time, with time increasing to the right.

A dashed line at time t (now) corresponds to the most recent observation y(t) in use by the forecasting process. To the left of the dashed line is the observed domain and to the right of the dashed line is the estimated domain. The forecast time horizon x corresponds to the time into the future from the time t for which a forecast at time t+x is made. A first forecast $F_1(t+x)$ is at least partially based on the observation y(t) at time t. Additional or supplemental forecasts are based on earlier observations, such as from data ending at a prior time t−m and data ending at a prior time t−2m to generate the additional or supplemental forecasts $F_2(t+x)|_{t-m}$, $F_3(t+x)|_{t-2m}$, respectively, for the time t+x. The interval m between these selected observations can vary in a very broad range and do not need to be the same value between observations as is illustrated in FIG. 1E. In one embodiment, the interval m between selected observations is selected to be longer than the duration of an expected or typical anomaly, such that the effects of a particular anomaly is present in only one of the observations used. This permits a relatively lengthy anomaly that is encountered in multiple observations to be identified and treated as an outlier. For example, if the downtime of a monitored system is expected to be under 2 hours, a value of 2 hours for the interval m will suffice.

In addition, it should be noted that the forecast time horizon x can be the same as or different from the value of m. In the illustrated example of monitoring a system that handles online sales of products, the selected forecast time horizon x and the selected interval m are each 2 hours long. In one embodiment, the process that will be described later in connection with FIG. 4 corresponding to the timing diagram of FIG. 1E and the process that will be described later in connection with FIG. 3 corresponding to the timing diagrams of FIG. 1C or 1D are combined. With reference to FIG. 1E, it can be observed that when an anomaly is encountered at a particular time t, as time progresses, the anomaly will shift into the past and eventually be encountered again at time t−m, then later at time t−2m, and then even later, be encountered again when retrieving an observation or related data (such as a seasonality factor) from a prior seasonal period, such as at times t+(x % s)−s, t−s, and the like.

Figure 2:
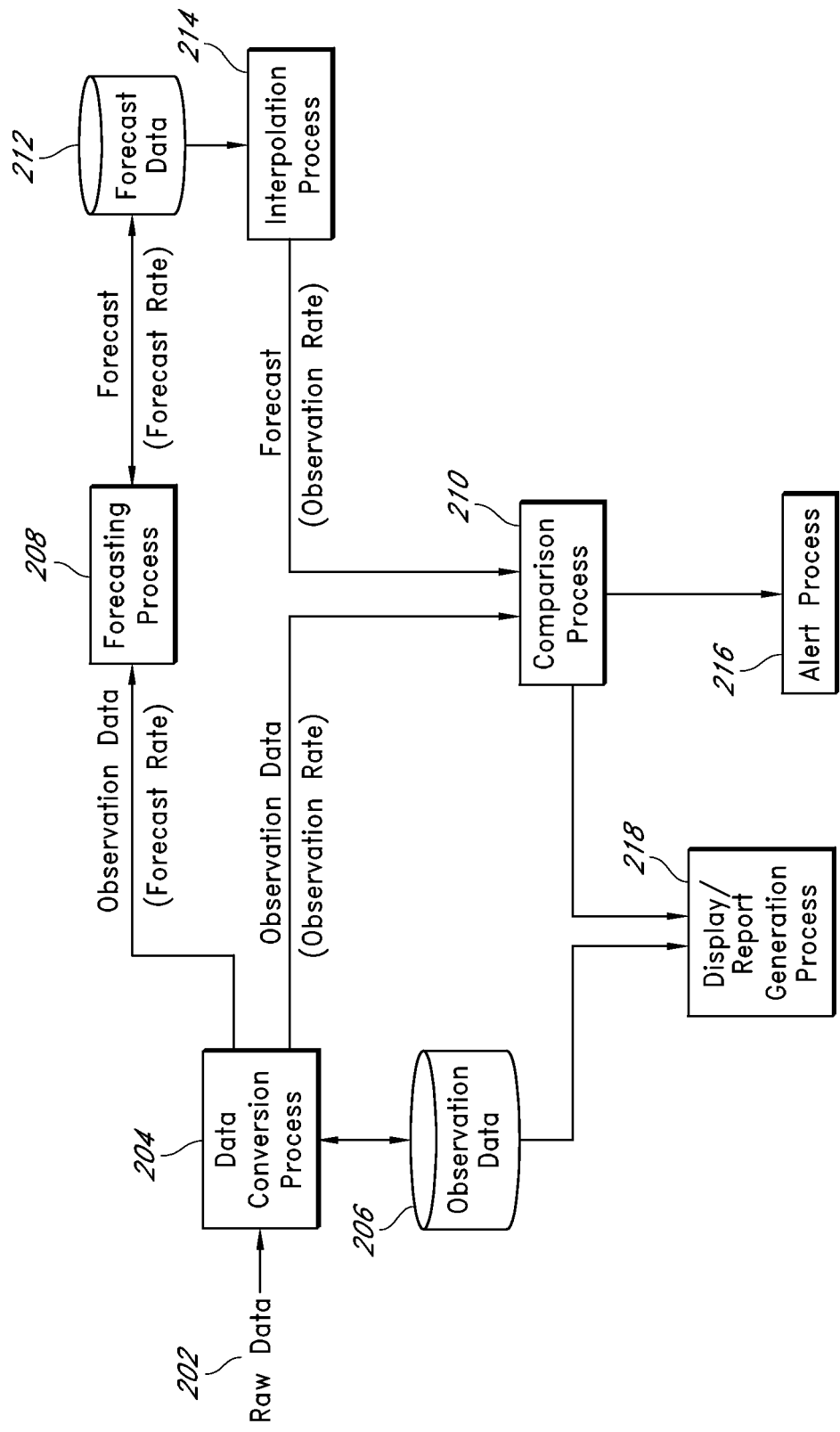
FIG. 2 illustrates a data flow diagram of a monitoring system according to an embodiment of the invention.

Data Flow Diagram (FIG. 2)

FIG. 2 illustrates a data flow diagram of a monitoring system according to an embodiment of the invention. It will be understood that the monitoring system can be modified in a variety of ways. For example, selected components can be deleted, rearranged, combined with other components, and the like. The forecasting system is a component of the illustrated monitoring system that monitors one or more metrics associated with the monitored system (see FIG. 6, discussed below).

Raw data 202 is provided as an input to a data conversion process 204. The raw data is typically a stream or series of data values of a particular metric, such as order rate or server response time. Although not depicted in FIG. 2, many different streams of metric data values may be received and separately analyzed by the forecasting system.

The data conversion process 204 can preprocess the raw data 202, and is used as appropriate for the raw data 202. For example, the data conversion process 204 can perform one or more of the following: transforms such as square root or log, normalization, exchange rate conversion, conversion of counts or latency measurements to rates, frequency elimination (low pass, high pass, or band pass filtering such as by Fast Fourier Transform), smoothing by moving averages or exponentially weighted moving averages, and the like. The output of the data conversion process 204 corresponds to an observation y(t) for time t. It will be understood that some types of raw data 202 do not need preprocessing and that an observation y(t) can correspond directly to the raw data 202.

An observation data store 206 stores the raw data 202 and/or the observations. The observations can be stored for pre-processing, for later retrieval for display, for initialization purposes, for retrieval of corresponding data from prior seasons, and the like. The observation data store 206 can be implemented with solid state memory, hard disks, combinations thereof, and the like.

The observation data y(t) is provided as an input to a forecasting process 208, and, where used for fault or abnormality detection, is also provided as an input to a comparison process 210. In the illustrated embodiment, the forecasting process 208 is performed at a slower rate, e.g., every 5 minutes, than the observation rate, e.g., every minute. However, it should be noted that the forecasting process 208 can also be performed at the observation rate. The forecasting process 208 is immune to anomalies that last fewer than N successive observations, where N corresponds to the number of prior seasons that are used to determine a seasonal adjustment factor. It will be understood that a value for N can be configured within a very broad range and an appropriate value will be readily determined by one of ordinary skill in the art.

The observation data y(t) used by the forecasting process 208 and the comparison process 210 can be the same data or can be different. This results when two different data conversion processes are applied to data provided to the forecasting process 208 and data provided to the observation data store 206 and comparison process 210. In one embodiment, a data conversion process used for the forecasting process 208 filters noise more aggressively than one used for the observation data store 206 and comparison process 210, yielding low-noise data for forecasting and detailed data for assessing the health of a monitored computer system. As used herein, the observation data y(t) indicates data that is used by the forecasting process 208. Additional processes that can be performed by the forecasting process 208 will be described in greater detail later in connection with FIGS. 4 and 5.

The forecasting process provides forecasts to a forecast data store 212 and retrieves forecast data, such as previous values, from the forecast data store 212. The forecasting process 208 can also be in communication with the observation data store 206 for initialization data.

An interpolation process 214 provides estimates of the forecast when the forecast is provided at a different rate than the observation data y(t). For example, the interpolation process 214 may convert a forecast expressed as orders per 5 minute interval to a forecast of orders per 1 minute interval for evaluation against observed orders per 1 minute interval. The interpolation process 214 communicates the forecast to the comparison process 210.

The comparison process 210 compares the observation data with corresponding forecast data. For example, the comparison process can use the forecast data to determine an expected range of values for the observations, and when the observations fall outside this range, the comparison process 210 can provide an indication to an alert process 216. The alert process 216 can perform functions such as generating an automated message indicating the type of problem detected and the like. A display/report generation process 218 can be used to generate a report, such as the charts illustrated in FIGS. 1A and 1B. The display/report generation process 218 can also "undo" data conversion processes 204, such as squaring data that had previously been square root transformed, for presentation.

The data flow diagram shown in FIG. 2 may, for example, be implemented within software executed by one or more general purpose computers.

Figure 3:
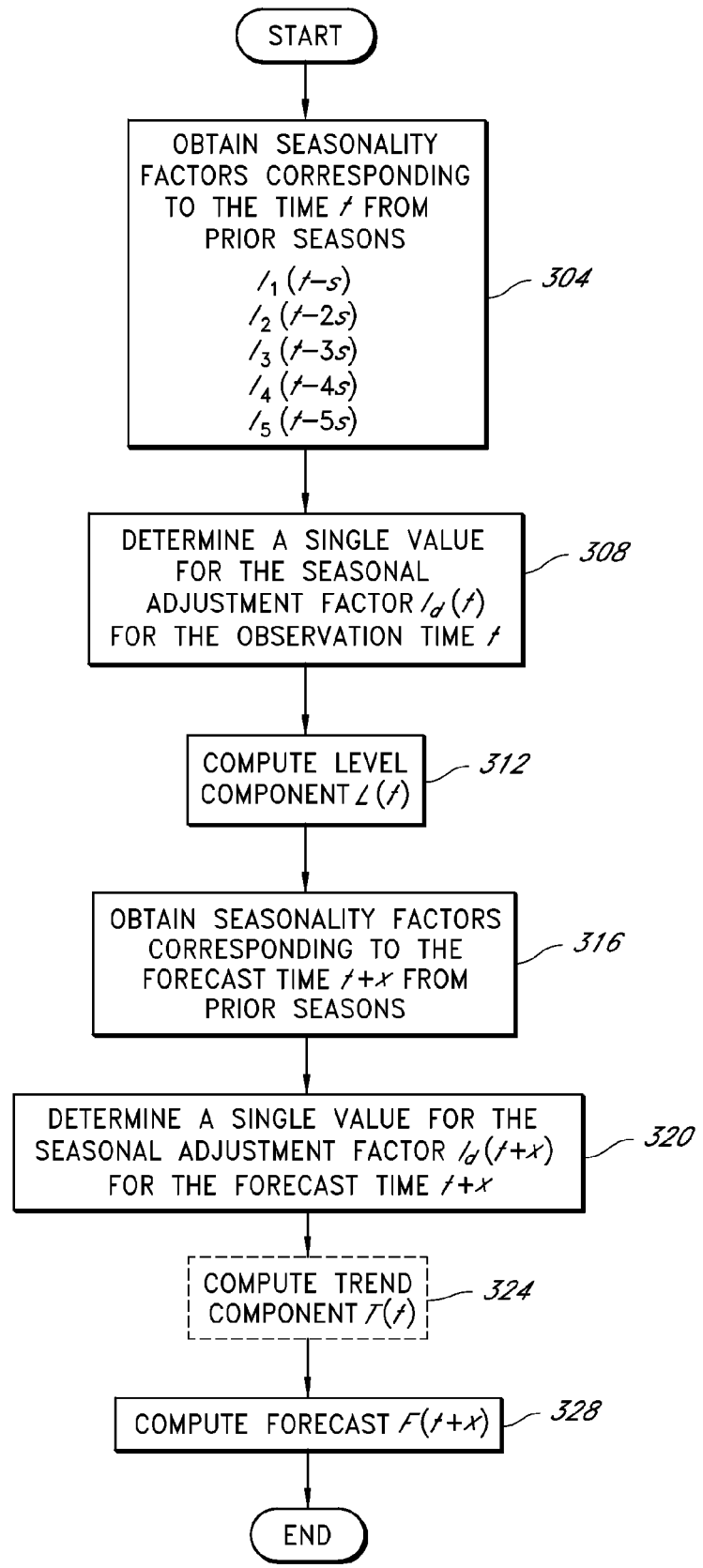
FIG. 3 is a flowchart that illustrates a process for generating a forecast, where the forecast is relatively immune from the effects of an anomaly in prior seasonal data.

Compensatory Techniques for Anomalies in Prior Seasonal Data (FIG. 3)

FIG. 3 is a flowchart that illustrates a process for generating a forecast, where the forecast is relatively immune from the effects of anomalies in prior seasonal data. This process corresponds generally to block 208 in FIG. 2, and may, for example, be implemented within software. It will be appreciated by the skilled practitioner that the illustrated process can be modified in a variety of ways. For example, in another embodiment, various portions of the illustrated process can be combined, can be rearranged in an alternate sequence, can be removed, and the like. These techniques overcome past problems with forecasting in the presence of anomalies, and permit forecasts to be used in a broad variety of applications and for a broad variety of purposes, including the monitoring of a computer system.

Conventional seasonal forecasting techniques, such as the Holt-Winters Seasonal ("HWS") method, produce relatively poor forecasts in the presence of anomalies. This problem is particularly acute when the anomaly corresponds to a failure or faulty condition and is then relied upon to generate a forecast of a normal condition. Moreover, with convention methods, such as the HWS method, these anomalies can take a relatively long time to dissipate. For example, in a conventional HWS method, the seasonal adjustment factors are updated with exponential smoothing. With exponential smoothing, a recent value is given more weight than an older value. The amount by which the weights vary is determined by a smoothing constant, which varies from 0 to 1.

With a relatively large value for the smoothing constant, forecasted seasonality factors are heavily determined by the prior season's seasonality factors. This renders the algorithm highly vulnerable to the presence of anomalies in the prior season. By contrast, a relatively low value for a smoothing constant can also be undesirable. A relatively small value for the smoothing constant will smoothen out the effect of a particular anomaly or outlier in the prior season, but the effect of an anomaly in the first season will adversely impact the forecast for a relatively long time. For example, where HWS is used with a low smoothing constant for a data series of one observation per day and with a seasonality of one week, an anomaly for the first Tuesday can take many months to dissipate; where HWS is used with a high smoothing constant for such a series, an anomaly in the most recent Tuesday will significantly impact forecasts for the next several weeks.

At the start of the illustrated process, the process has already been initialized and the corresponding data series has been collected. The process is using an observation y(t) at time t, and is generating a forecast for a time t+x. One example of an automated technique to initialize the process is described below. It should be noted that time t corresponds to a time from which a forecast is being generated, and that this time t can be the present time or can be a time in the past. For example, it will be understood that when a forecasting process is initially started, it is typically started with some initialization data and runs through ("trained on") accumulated data until it reaches the present time. Accordingly, time t does not necessarily have to correspond to the present time.

At state 304, the process obtains a plurality of N seasonality factors I from N prior seasons to compute a seasonal adjustment factor $I_d(t)$ for time t. Computation of a seasonality factor I for time t will be described later in connection with Equation 1. Typically, a value of N that is greater than or equal to three is used. In the illustrated example, a value of 5 for N will be used. Other values of N, such as 3, 4, 6, 7, 8, 9 or 10, may alternatively be used. The process can obtain the plurality of seasonality factors by a variety of techniques, such as by computation based on observations, by retrieval from memory of previous computations, and the like. It will be understood that where computations are relatively frequently accessed, it is typically efficient to store data and access the data using arrays and pointers.

An offset corresponding to the length of the seasonal period s in units of time t, such as the unit of time between observations. For example, where the seasonal period is a 7-day week, and time t is maintained in 1-minute intervals, an appropriate value for s is s=(7 days)(24 hours/day)(60 minutes/hour), which is 10,080. Where data is indexed at other intervals, such as at forecast intervals (which may be different from observation intervals), the value of s can vary. For example, with one-week seasonality and 5-minute intervals, an appropriate value for s is 2,016. The remainder of the process illustrated in FIG. 3 will be described in the context of data indexed in 5-minute intervals. It will be understood that appropriate values for s will depend on the seasonality of the data series and the indexing of the data in memory. In one embodiment, daylight savings time is taken into account when referencing corresponding seasonal data.

In the illustrated example, the process retrieves the 5 seasonality factors that are most recent in time to time t. For example, where the seasonality is one week, these seasonality factors are obtained from the 5 preceding weeks. These seasonality factors will be referred to by $I_1(t-s)$, $I_2(t-2s)$, $I_3(t-3s)$, $I_4(t-4s)$, and $I_5(t-5s)$. Equation 1 expresses a general formula for a seasonality factor $I_n(t-ns)$ from n seasons ago to time t. A seasonality factor $I_n(t-ns)$ corresponds to a scale factor representing the seasonal fluctuation of a data point at time t-ns relative to a seasonality-stripped average. Although described in the context of the following equation or model, it will be understood that other mathematical forms that provide the same function will be readily determined by one of ordinary skill in the art.

$$I_n(t-ns) = \frac{y(t-ns)}{L(t-ns)} \quad \text{Equation 1}$$

In Equation 1 above, y(t-ns) corresponds to a value of an observation at time t-ns and L(t-ns) corresponds to a value for a "level" component of a forecast at time t-ns. A level component L is a form of an average value. An example of a computation for a level component L for time t will be described in greater detail later in connection with state 316. It will be observed that the obtained seasonality factors can be retrieved from prior calculations or can also be calculated relatively easily. The process proceeds from state 304 to state 308.

In state 308, the process determines a single value for the seasonal adjustment factor $I_d(t)$. The technique used to determine the single value can vary with the number N of seasonality factors $I_n$ used. In the illustrated example, the 5 seasonality factors $I_1(t-s)$, $I_2(t-2s)$, $I_3(t-3s)$, $I_4(t-4s)$, and $I_5(t-5s)$ are sorted by value, the high value and the low value seasonality factors are substantially or fully discarded (given zero or near-zero weight), and the remaining 3 are combined in an unequally weighted average with the median value weighted at 50%, and the other 2 values weighted at 25%. It will be understood that a wide range of other weights can be applied and will be readily determined by one of ordinary skill in the art. It will also be understood that multiplication by a relatively small number will generate substantially the same results as a multiplication by zero. Advantageously, by weighting the high value and the low value with relatively low weights, such as with zero, an anomaly in the seasonality factors for the time t, e.g., $I_1(t-s)$, $I_2(t-2s)$, $I_3(t-3s)$, $I_4(t-4s)$, and $I_5(t-5s)$, can be substantially ignored.

A broad variety of variations and other techniques can be used. For example, a median value of the obtained seasonality factors can be selected as the seasonal adjustment factor $I_d(t)$. The selection of the median value is a useful technique when N is 3. In another example, high and low values are at least substantially discarded and an average, equally or unequally weighted, of the remaining adjustment factors is used; such an average may, for example, be weighted by a probability distribution function such as that of a normal distribution. In one embodiment, where an unequally weighted average is used, values near to or at the median of the adjustment values are more heavily weighted than values at extremes. In another example, geometric means are used. These geometric means can be equally or unequally weighted, can be combined with substantial elimination of high and low values, and the like. After the seasonal adjustment factor $I_d(t)$ is determined, the process advances from state 308 to state 312.

In state 312, the process computes the level component L(t) using the seasonal adjustment factor $I_d(t)$ determined in state 308. In one embodiment, but for the use of the seasonal adjustment factor $I_d(t)$, the computation for the level component L(t) corresponds to the level component L(t) for the Holt-Winters Seasonal (HWS) model. Equation 2A expresses a formula for the level component L(t) without inclusion of a trend component. Equation 2B expresses a formula for the level component L(t) with the trend component, which will be described later in greater detail in connection with Equation 4. The level component L(t) represents a moving average of the data, illustrated here as an exponentially-weighted moving average, with seasonal effects removed. Although described in the context of the following equation or model, it will be understood that other mathematical forms that provide the same function will be readily determined by one of ordinary skill in the art.

$$L(t) = \alpha \frac{y(t)}{I_d(t)} + (1-\alpha)L(t-1) \quad \text{Equation 2A}$$

$$L(t) = \alpha \frac{y(t)}{I_d(t)} + (1-\alpha)\{L(t-1) + T(t-1)\} \quad \text{Equation 2B}$$

In Equations 2A and 2B, α corresponds to a smoothing value, which is typically an experimentally determined constant between 0 and 1. The smoothing value α can also correspond to a value that is adaptively changed in response to an error measurement. In one embodiment, with forecasts computed and with data indexed at 5-minute intervals, the smoothing value α is a constant with a value of 0.01. In Equations 2A and 2B, y(t) corresponds to the observation at time t, $I_d(t)$ corresponds to the seasonal adjustment factor determined in state 308, and L(t−1) corresponds to a value of the level component from the forecast immediately prior to the level component L(t), and is denoted as at time t−1. Initialization of the level L will be described later. Division of the observation y(t) by the seasonal adjustment factor $I_d(t)$ "deseasonalizes" the observation y(t), i.e., compensates for the expected seasonal fluctuation for the observation y(t). The process advances from state 312 to state 316.

In state 316, the process obtains a plurality of seasonality factors I from prior seasons from points corresponding to the forecast at time t+x. A formula expressing a seasonality factor $I_n$ for the time t+x will be described later in connection with Equation 3. These seasonality factors $I_n$ are spaced at an integer multiple n of seasonal period s from the time t+x. For example, the process can retrieve 5 seasonality factors from the 5 most recent seasons corresponding to the time t+x as illustrated in Equation 3. For example, as illustrated in FIG. 1C, when the forecast time horizon x is less than or equal to the seasonal period s, the 5 most recent seasonality factors occur at times t+x−s, t+x−2s, t+x−3s, t+x−4s, and t+x−5s. More generally, i.e., for a forecast time horizon x that can be any value relative to the seasonal period s, the 5 most recent seasonality factors occur at times t+(x % s)−s, t+(x % s)−2s, t+(x % s)−3s, t+(x % s)−4s, and t+(x % s)−5s, where "%" indicates the modulo operator as described earlier in connection with FIG. 1D. These 5 corresponding seasonality factors can be denoted by $I_1$(t+(x % s)−s), $I_2$(t+(x % s)−2s), $I_3$(t+(x % s)−3s), $I_4$(t+(x % s)−4s), and $I_5$(t+(x % s)−5s). Equation 3 expresses a formula for a seasonality factor for the time of forecast t+x from the n-th prior season. The seasonality factor expressed in Equation 3 corresponds to a scale factor representing the seasonal fluctuation of a data point at time t+(x % s)−s relative to a seasonality-stripped average. The modulo operator "%" provides that the data point is in the observed domain. Although described in the context of the following equation or model, it will be understood that other mathematical forms that provide the same function will be readily determined by one of ordinary skill in the art.

$$I_n(t + (x \% s) - ns) = \frac{y(t + (x \% s) - ns)}{L(t + (x \% s) - ns)}$$  Equation 3

In the illustrated embodiment, in state 320, the process determines a single value $I_d$(t+x) for the seasonal adjustment factor for the time t+x in a similar manner to that described earlier in connection with states 304 and 308 for determining a single value for the seasonal adjustment factor $I_d(t)$ for the time t. The seasonality factors used in determining the single value $I_d$(t+x) for the seasonal adjustment factor can be retrieved from memory, can be computed, and the like.

A variety of techniques can be used to determine the single value for the adjustment factor for state 320. For example, the technique described in connection with state 308 can be used, where the high seasonality factor and the low seasonality factor are substantially discarded, and the remaining seasonality factors are combined to generate a weighted average. Where used, the process proceeds to an optional state 324 to compute a trend component T(t), and otherwise proceeds to state 328 to compute a forecast F(t+x) for the forecast time t+x.

In the optional state 324, the process computes the trend component T(t). The trend component T(t) accounts for data series that have a trend. It will be understood that some data series exhibit relatively little or no trend. It will also be observed that when a forecast time horizon x is relatively small, then the contribution to the forecast F(t+x) by the trend component T(t) will typically be relatively small and can be negligibly small in certain instances. Equation 4 expresses one computation for the trend component T(t). The trend component T(t) functions as a slope. Although described in the context of the following equation or model, it will be understood that other mathematical forms that provide the same function will be readily determined by one of ordinary skill in the art.

$$T(t) = \gamma\{L(t) - L(t-1)\} + (1-\gamma)T(t-1)$$  Equation 4

In Equation 4, γ corresponds to a smoothing value between 0 and 1, which is typically a constant. It will be understood by one of ordinary skill in the art that an appropriate value to use for the smoothing value γ can vary depending on the data series, and is typically determined experimentally. L(t−1) denotes a value of the level component from a prior forecast at time t−1 (prior in the index), and T (t−1) corresponds to a value of the trend component from the prior forecast at time t−1. In one embodiment, where the forecasts for sales orders are generated in 5-minute intervals, the forecast time horizon x is 2 hours, the trend component T(t) is considered negligible, the value of γ is set to zero, and the values of prior trend components are initialized to zero, effectively not computing the trend component T(t). The process advances from the optional state 324 to state 328.

In state 328, the process computes a forecast F(t+x) for the forecast time t+x. As will be described later in connection with FIG. 4, one embodiment of the process further computes a plurality of forecasts for the forecast time t+x, and determines a forecast from the plurality of forecasts to desensitize the process from an anomaly in the observation y(t) for or shortly preceding time t.

Equation 5 expresses a formula for computing the forecast F(t+x) for the forecast time t+x from the observation y(t) for time t. In Equation 5, the forecast F(t+x) is computed from the level component L(t), the trend component T(t), the forecast time horizon x, and the seasonal adjustment factor $I_d$(t+x) for the forecast time t+x. Although described in the context of the following equation or model, it will be understood that other mathematical forms that provide the same function will be readily determined by one of ordinary skill in the art.

$$F(t+x) = \{L(t) + xT(t)\}I_d(t+x)$$  Equation 5

Where the trend component is not used or computed, the expression illustrated in Equation 5 can also be simplified as shown below in Equation 6. Although described in the context of the following equation or model, it will be understood that other mathematical forms that provide the same function will be readily determined by one of ordinary skill in the art.

$$F(t+x) = L(t)I_d(t+x)$$  Equation 6

It should be noted that in the forecasting equations expressed in Equation 5 and in Equation 6, the forecast time "t+x" within the parenthesis to the left of the equal sign is not an operand for the equations (Equation 5 or Equation 6), i.e., the forecast time "t+x" is not used in the equations, but rather indicates the time for which a forecast is made. For clarity, the time t has been referred to as the "present time," but it should be understood that as time progress, the time t will also progress. The time t refers to the time of the observation y(t) from which the forecast is made. The time t can be used with the seasonal period s as an index to retrieve stored data. The forecast time horizon x can be computed by calculating the difference between the forecast time t+x and the time t corresponding to the observation used.

In addition, as will be explained later in connection with FIG. 4, an observation from a time other than the "present time" t can also be used to generate a forecast at time t+x. For example, observations ending with a prior time t−m or observations ending with a prior time t−2m, can be used. It will be understood that data retrieved to calculate the forecasts from prior times will vary with the prior times selected. In addition, the forecast time horizon x will also change (increase) when the forecast for time t+x is generated from an earlier time than the "present time" t. These concepts will be discussed in further detail later in connection with FIG. 4.

The resulting forecast F(t+x) from the process illustrated in connection with FIG. 3 is relatively immune from the effects of an anomaly in prior seasonal data.

Initialization Considerations

It will be understood by one of ordinary skill in the art that data for the process depicted in FIG. 3 can be initialized manually or by an automatic process. The cyclical period of a season is typically determined by an analyst. Typically, data for at least one full season is collected prior to using the seasonal forecasting techniques. In one embodiment, an average for the first season is used as an initial value for the level component, L(t) for values of t in the first season. An initial value for a seasonal adjustment factor can correspond to the observation divided by the average for the first season, and an initial value for the trend component T(t) for values of t in the first season can correspond to zero. The process is completely initialized after N seasons have elapsed, where N is the number of seasons used in the process as described earlier in connection with FIGS. 2 and 3. Appropriate values to use for smoothing values or smoothing constants are typically determined experimentally.

Figure 4:
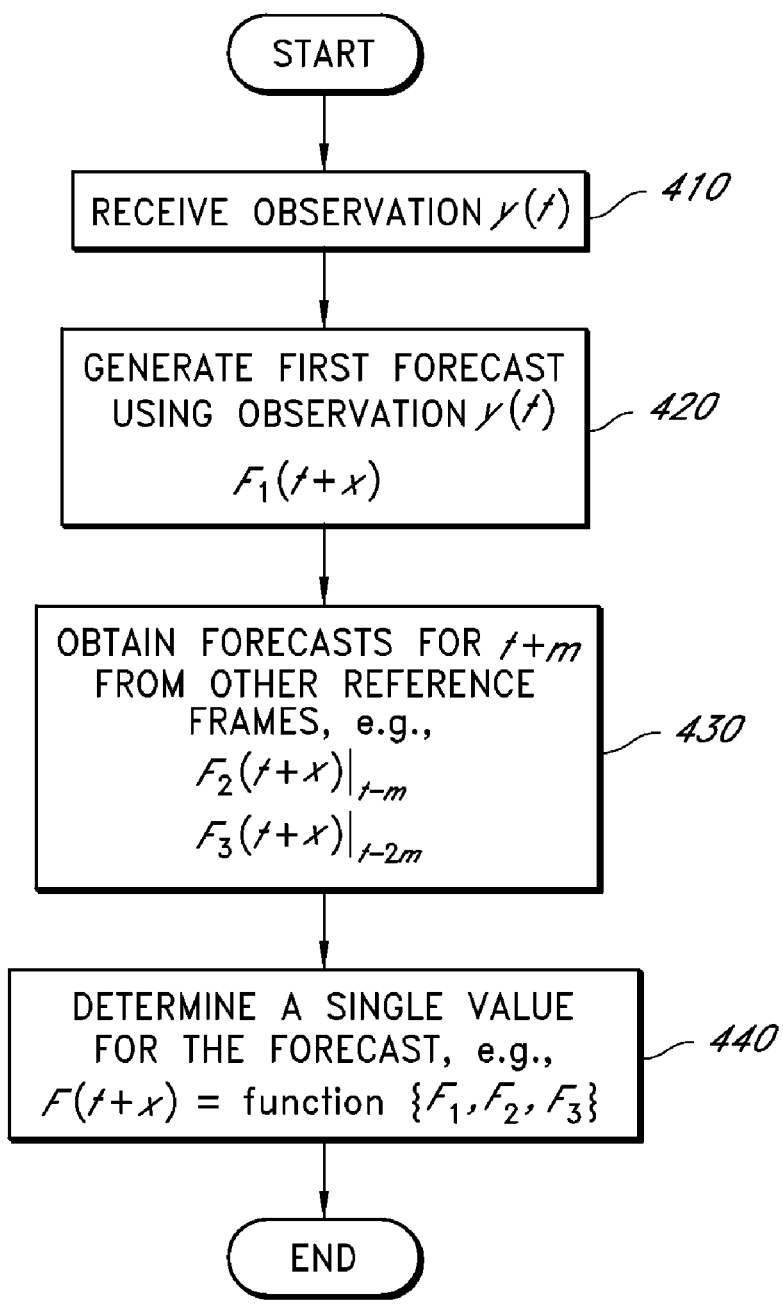
FIG. 4 is a flowchart that illustrates a process for generating a forecast, where the forecast is relatively immune from the effects of an anomaly in a "present" or recent observation.

Compensatory Techniques for Anomalies in Present Observations (FIG. 4)

FIG. 4 is a flowchart that illustrates a process for generating a forecast, where the forecast is relatively immune from the effects of an anomaly in a "present" observation. The process of FIG. 4 can be used in combination with the process of FIG. 3, or can be used independently. It will be appreciated by the skilled practitioner that the illustrated process can be modified in a variety of ways. For example, in another embodiment, various portions of the illustrated process can be combined, can be rearranged in an alternate sequence, can be removed, and the like. These techniques reduce past problems with forecasting in the presence of anomalies.

At the start of the process illustrated by the flowchart, the process has already been initialized, and the corresponding data series has been collected. At state 410, the process retrieves an observation y(t) corresponding to a time t. Typically, this time t corresponds to the most recent observation y(t) available, but it will be understood that the time t can correspond to other observation such as the observation immediately prior. The overall function of the process is to generate a forecast for time t+x, where x corresponds to a forecast time horizon from an observation y(t) at time t and previous observations.

In the illustrated embodiment, the previous observations are spaced apart at regular intervals m. The interval m between the observations used to generate the multiple forecasts can be selected in a very broad range, and the interval can also vary between the selected observations. In one embodiment, the forecast interval is selected to be large enough so that when an anomaly occurs, the anomaly is typically contained within one interval m. It will be apparent that when the forecasting techniques are used to detect abnormalities due to faults, the response time for corrective action for these faults, such as the rebooting or reconfiguring of servers, can also affect the selected interval m. In the illustrated embodiment with sales orders, the selected interval m corresponds to 2 hours. The forecast time horizon x can also vary in a very broad range. In the illustrated embodiment, which is performed in real time, the forecast time horizon x is selected to be equal to m (2 hours) for the forecast based on the observation y(t) from time t. Other appropriate values for the interval m and for the forecast time horizon x will be readily determined by one of ordinary skill in the art. It should also be noted that time t corresponds to a time from which a forecast is being generated, and that this time t can correspond to the present time or can correspond to a time in the past.

In state 420, the process generates a forecast for time t+x from the observation y(t) for time t. In one embodiment, the process computes each of the multiple forecasts using the techniques described earlier in connection with FIG. 3. In another embodiment, the process uses a forecast from another technique, such as the Holt-Winters Seasonal (HWS) forecasting technique.

In state 430, the process obtains one or more supplemental forecasts for the time t+x. These one or more supplemental forecasts are based on earlier observations, such as from one or more observations ending with observation y(t−m) or from one or more observations ending with observation y(t−2m). In one embodiment, additional observations, while available in the observed domain, are not used in calculating the supplemental forecasts. This provides alternatives to the forecast computed based on the observation y(t), so that the process can account for an anomaly in the observation y(t). The process can obtain the one or more other forecasts in a variety of ways. For example, the one or more supplemental forecasts can be computed when used. In another example, the one or more supplemental forecasts can be computed in advance, such as at times t−m, t−2m, and the like, stored for later use, and retrieved at time t as needed.

In addition, the one or more supplemental forecasts can vary in number. In the illustrated example, the process computes two additional forecasts, denoted as $F_2(t+x)|_{t-m}$ and $F_3(t+x)|_{t-2m}$. Forecast $F_2$ corresponds to a forecast for time t+x based on data series ending at time t−m. Forecast $F_3$ corresponds to a forecast for time t+x based on data series ending at time t−2m. Using Equation 5 or Equation 6, for example, forecast $F_2$ can be computed relative to time t−m with the observation y(t−m) by computing a forecast with a forecast time horizon equal to m+x. In another example, Forecast $F_3$ can be computed relative to time t−2m with the observation y(t−2m) by computing a forecast with a forecast time horizon equal to 2m+x. The process advances from state 430 to state 440.

In state 440, the process determines a single value for the forecast at time t+x from the multiple forecasts, e.g., $F_1$, $F_2$, and $F_3$, for time t+x. In one embodiment, the process selects the median value of forecasts $F_1$, $F_2$, and $F_3$. However, other techniques to determine the single value can be used. For example, the multiple forecasts can be combined in a weighted average. In another example, where at least 3 forecasts are available, the highest value and the lowest value are substantially or fully discarded, and the remaining values are combined by a weighted average or an unweighted average. In another example, the process uses weights for weighted averages, which are more heavily weighted for forecasts near to or at the median and less heavily weighted at extremes. Other techniques will be readily determined by one of ordinary skill in the art.

Advantageously, the use of multiple forecasts for a forecast at time t+x based on observations from multiple times desensitizes the forecast from an anomaly present at time t of duration less than interval m. When combined with the techniques described earlier in connection with FIG. 3, the forecasting technique is relatively immune to anomalies both in prior historical data and in recent observations y(t).

Figure 5:
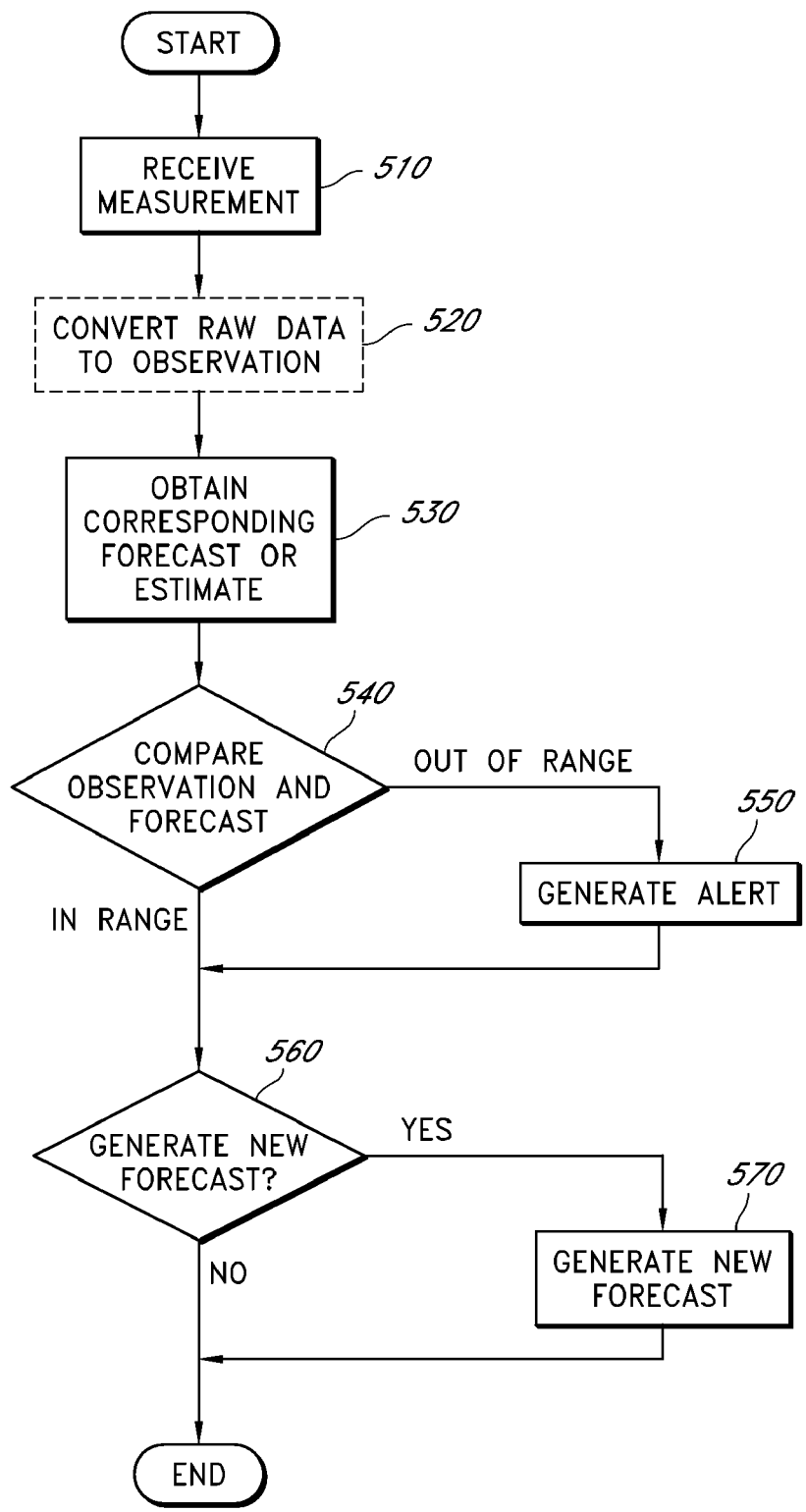
FIG. 5 is a flowchart that illustrates a process for detecting an abnormality with the forecasting techniques.

Anomaly Detection (FIG. 5)

FIG. 5 is a flowchart that illustrates a process for detecting an abnormality with the forecasting techniques. Advantageously, the illustrated processes generate forecasts that are relatively unperturbed to the deleterious effects of anomalies. For example, these abnormalities can be detected by the process to raise alarms or for other corrective action and yet not corrupt future forecasts. It will be appreciated by the skilled practitioner that the illustrated process of FIG. 5 can be modified in a variety of ways. For example, in another embodiment, various portions of the illustrated process can be combined, can be rearranged in an alternate sequence, can be removed, and the like.

The process starts by receiving 510 a measurement. The measurement can correspond to a variety of measurable quantities or metrics, such as a response time measurement, a system load measurement, or a count of the number of sales orders received in a particular window of time.

The process optionally proceeds to convert 520 the raw data corresponding to the measurement to an observation used by the forecasting process. It will be understood that some measurements can be used directly as observations, and that others may be pre-processed. For example, where the raw data is relatively noisy, a pre-processing smoothing technique can be used. In one embodiment involving the analysis of order rate data, the process converts the count of the number of orders by counting within 1 minute or 5 minute intervals for abnormality detection or forecasting, respectively. The order rates are then square-rooted, converted to frequency domain, low-pass filtered in frequency domain, and then converted back to time-domain. For example, Fast Fourier Transform (FFT) and inverse Fourier Transform techniques can be used.

The process proceeds to obtain 530 a forecast for the corresponding observation. For example, the process can retrieve a forecast made earlier in time that corresponds to an estimate for the order rate at the present time. In one embodiment, where the abnormality detection and the forecasts are processed at different rates, the process can further interpolate between the forecasts to obtain 530 a forecast for the corresponding observation.

In the decision block 540, the process compares the observation with the forecast, or with ranges at least partially based on the forecast. When the observation is out of an expected range, such as beyond a tolerance or outside of a predetermined or selected amount of variability away from the forecast, the process can generate 550 an automated alert. The alert can correspond to an electronic message, such as to a wireless pager message, an email message, text message, an audible alarm, a visual indicator, and the like. The alert can also be used for other purposes, such as to disable processes or machinery, or to initiate data logging processes. The process proceeds from generating 550 the alert to a second decision block 560. Returning now to decision block 540, if the observation is within the expected range, the process proceeds to the second decision block 560.

In the second decision block 560, the process determines whether or not to generate a new forecast. In one embodiment, the process generates a new forecast with a 2-hour forecast time horizon x at 5-minute intervals and uses interpolated estimates in between estimated forecasts. Of course, other appropriate intervals will vary depending on the metric being forecasted, and will be readily determined by one of ordinary skill in the art. In addition, the forecast time horizon x and the interval m can be adjusted or suspended for periods when the forecast is not applicable, e.g., when the monitored system is taken off line. If a new forecast is to be generated, the process proceeds from the second decision block 560 to generate 570 a new forecast. These forecasts can be generated 570 using one or more of the techniques described earlier in connection with FIGS. 3 and 4. Otherwise, the process ends and returns to the start of the process for processing of new measurements.

Figure 6:
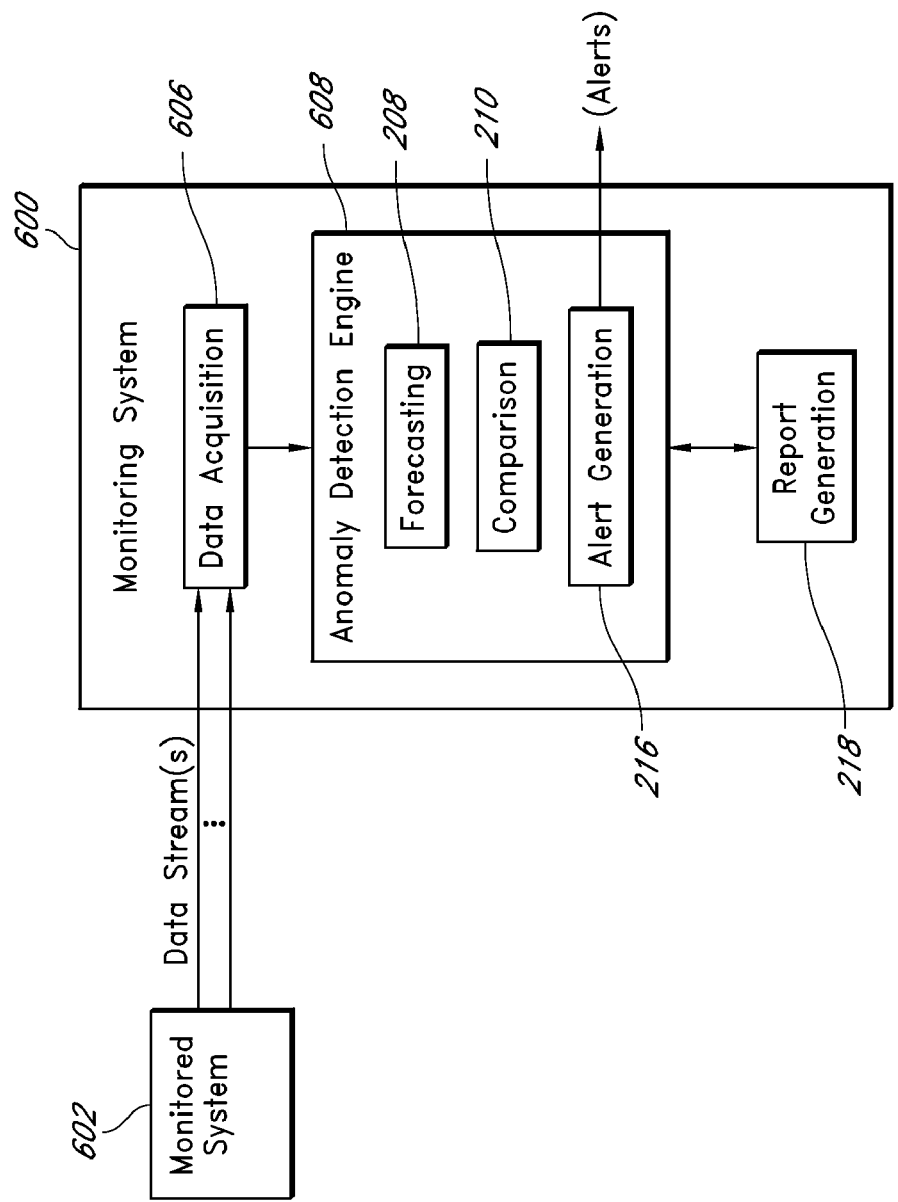
FIG. 6 illustrates a monitoring system that monitors the operation, health, and/or usage of another system.
Figure 7:
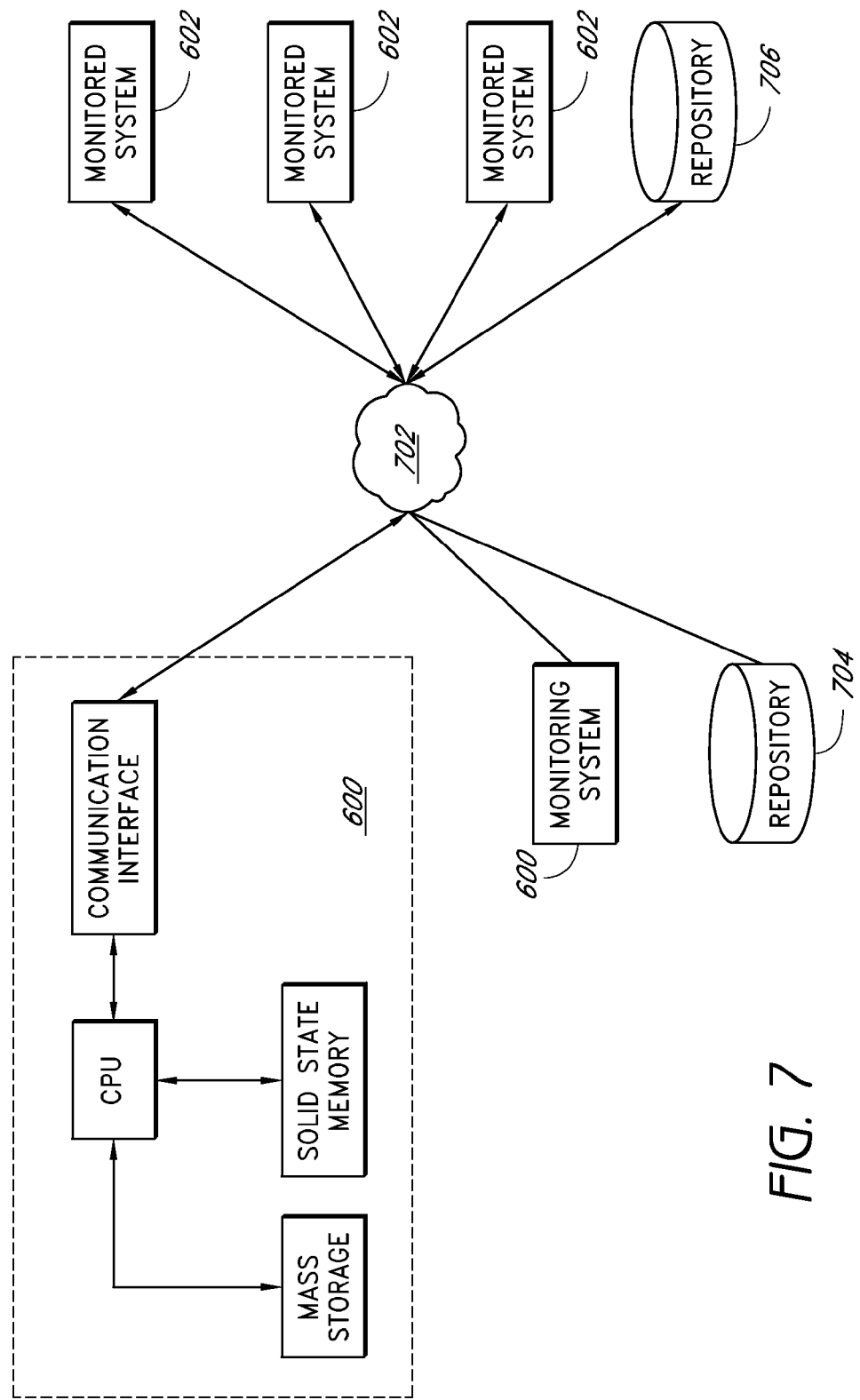
FIG. 7 illustrates an example of monitoring system and other networked components.

Example Monitoring System (FIGS. 6 and 7)

FIG. 6 illustrates how the above-described methods may be incorporated into a monitoring system 600 that monitors another system, referred to herein as the monitored system 602. The monitored system 602 may, for example, be a server or collection of servers of a web site system, an email server, a database server, a telecommunications system, a web server machine, a network router, or any other type of system for which usage levels tend vary seasonally. The monitoring system 600 may, for example, be implemented as a general purpose computer, or a collection of general purpose computers, that is locally or remotely connected to the monitored system 602 by a computer network.

As illustrated, the monitoring system 600 receives one or more streams of data values from the monitored system 602. Each data stream contains data values or measurements associated with a corresponding metric, such as order rate, server response time, page latency, or CPU utilization. As mentioned above, some data streams may correspond to the same metric; for example, where order rates are monitored, different data streams may be generated for each item or item category. As another example, separate page latency data streams may be generated for different pages or areas of a web site.

The task of acquiring the data streams is handled by a data acquisition component 606. The data acquisition component 606 may obtain the metric data values by, for example, passively monitoring traffic generated on a computer network by the monitored system 602, making API calls or queries to one or more computers of the monitored system, and/or communicating with a software-based probe that runs on the monitored system. For example, in the case of order rates, the order rate data values may be generated by monitoring and counting order messages broadcast on a local network of the monitored system 602, or by querying a database of orders.

The acquired data streams are passed to an anomaly detection engine 608, which analyzes each stream independently of the others. The anomaly detection engine 608 includes a forecasting component 208 that applies the above-described forecasting methods to each data stream to generate corresponding forecasts. Because the forecasting methods are computationally efficient, many hundreds to thousands of data streams can be monitored concurrently, and substantially in real time, using a single general-purpose computer. Advantageously, this monitoring may also be accomplished using multiple computers to maintain functionality in the event of a server crash or similar problem. The forecasts are used by a comparison component 210, as described above, to detect anomalies in specific data streams.

At least some of the detected anomalies are reported to personnel by an alert generation module 216. The identities of those notified of a particular anomaly depend upon the particular type of anomaly detected, including the identity of the underlying metric or activity being monitored. As illustrated, the monitoring system 600 may also include a report generation module 218 that may, for example, be accessible via a web browser to interactively generate anomaly reports.

The data acquisition component 606, anomaly detection engine 608, and report generation module 218 may be embodied in software that is stored in a memory of, and executed by, a general purpose computer. To provide increased performance, selected algorithms of the forecasting component 208, and possibly the comparison component 210, may be implemented in specialized computer hardware, such as one or more application specific integrated circuits (ASICs).

FIG. 7 illustrates an example of the monitoring system 600 and other networked components. The illustrated monitoring system 600 system can include, for example, a communication interface to communicate with other systems using a network 702. The network 702 can include any medium suitable for the transmission of data including internal networks and external networks, private networks and public networks (such as the Internet), and wired, optical, and wireless networks. It will be understood by one of ordinary skill in the art that data carried by these networks may be encrypted.

The network 702 permits the monitoring system 600 to communicate with the monitored systems 602, for data repositories 704, 706 that can include, for example, historical data for a monitored system 602, and other systems, such as email systems, pager systems, phone systems, for sending alerts and the like.

The monitoring system 600 can include a central processing unit (CPU). The monitoring system 600 can be a uniprocessor or a multiprocessor machine. In addition, the monitoring system 600 can include a computer memory, such as, but not limited to, mass storage, solid state memory, and the like. Examples include magnetic disks, such as hard disks and floppy disks, magnetic tapes, solid state memories, such as access memory (RAM), electronically erasable programmable read-only memory (EEPROM), flash memory, magneto optical disks, optical disks, such as CD-ROMs, CD-R/Ws, DVD-ROMs, and the like. It will also be understood that information, such as data series, can be organized within a computer memory using database techniques, arrays, and the like.

Various embodiments have been described above. Although described with reference to these specific embodiments, the descriptions are intended to be illustrative and are not intended to be limiting. Various modifications and applications may occur to those skilled in the art without departing from the true spirit and scope of the invention as defined in the appended claims.

What is claimed is:

1. A system for monitoring a monitored computer system, the monitoring system comprising:
 a computer data repository that stores a first plurality of seasonality factors for a first time t from prior seasons for the monitored computer system and a second plurality of seasonality factors for a second time t+x from prior seasons for the monitored computer system, where x is a forecast time horizon; and
 a processor programmed, via executable program code, to at least:

determine a first seasonal adjustment factor for the first time t based at least in part on the first plurality of seasonality factors;
 deseasonalize an observation y(t) of a metric of the monitored computer system at the first time t based at least in part on the first seasonal adjustment factor;
 determine a level component based at least in part on the deseasonalized observation of the monitored computer system;
 determine a second seasonal adjustment factor for the second time t+x based at least in part on the second plurality of seasonality factors; and
 compute a first forecast $F_1(t+x)$ based at least in part on the level component and the second seasonal adjustment factor for the second time t+x, wherein the first forecast $F_1(t+x)$ is considered in determining a computed forecast F(t+x) for the metric of the monitored computer system.

2. The system of claim 1, wherein the first plurality of seasonality factors are from the prior seasons that are closest in time to the first time t.

3. The system of claim 1, wherein the processor is further programmed to determine the first seasonal adjustment factor by calculating an average of at least some of the first plurality of seasonality factors.

4. The system of claim 1, wherein the first plurality of seasonality factors comprises at least three seasonality factors, and the processor is further programmed to:
 at least substantially ignore a high value and a low value from among the at least three seasonality factors; and
 determine the first seasonal adjustment factor from the remaining seasonality factors.

5. The system of claim 1, wherein the second plurality of seasonality factors are from the prior seasons that are closest in time to the second time t+x.

6. The system of claim 1, wherein the processor is further programmed to determine the second seasonal adjustment factor by calculating an average of at least some of the second plurality of seasonality factors.

7. The system of claim 1, wherein the second plurality of seasonality factors comprises at least three seasonality factors, and the processor is further programmed to:
 at least substantially ignore a high value and a low value from among the at least three seasonality factors; and
 determine the second seasonal adjustment factor from the remaining seasonality factors.

8. The system of claim 1, wherein the processor is further programmed to:
 compute a trend component; and
 compute the first forecast $F_1(t+x)$ at least partially based on the level component, the second seasonal adjustment factor, the forecast time horizon x, and the trend component.

9. The system of claim 1, wherein the processor is further programmed to:
 obtain one or more supplemental forecasts of the metric of the monitored computer system for the second time t+x, where the one or more supplemental forecasts are based only on data from earlier in time than the first time t; and
 determine a value for the forecast F(t+x) based at least in part on one or more of the first forecast $F_1(t+x)$ and the one or more supplemental forecasts.

10. The system of claim 9, wherein to obtain the one or more supplemental forecasts the processor is further programmed to:

determine a second forecast $F_2(t+x)$ based on observations of the metric of the monitored computer system from times earlier than t−m;

determine a third forecast $F_3(t+x)$ based on observations of the metric of the monitored computer system from times earlier than t−2m, where m is a time interval.

11. The system of claim 10, wherein the time interval m is selected to be longer than a duration of an expected or typical anomaly of the metric of the monitored computer system.

12. The system of claim 1, wherein the processor is further programmed to:
   determine an expected range of observations of the metric of the monitored computer system, the expected range at least partially based on the computed forecast $F(t+x)$; and
   compare an observation $y(t+x)$ to the computed forecast $F(t+x)$ or to the expected range of observations to determine whether an anomaly is present in the monitored computer system.

13. The system of claim 12, wherein the processor is further programmed to generate an alert or initiate a corrective action at least partially in response to the determination that an anomaly is present in the monitored computer system.

14. The system of claim 13, wherein the corrective action comprises one or more of the following: (1) executing a load balancing program, (2) rebooting or reconfiguring a server, and (3) correcting erroneous data on a web site.

15. The system of claim 13, wherein the alert comprises an electronic message.

16. The system of claim 1, wherein the processor is further programmed to acquire a stream of data values from the monitored computer system, the data values representative of the metric of the monitored computer system.

17. The system of claim 16, wherein to acquire the stream of data values, the processor is further programmed to perform one or more of the following: (1) monitor traffic generated on a computer network by the monitored computer system, (2) make API calls or queries to the monitored computer system, and (3) communicate with a software-based probe configured to run on the monitored computer system.

18. The system of claim 1, wherein the monitored computer system comprises a networked system comprising at least one computer.

19. The system of claim 1, wherein the metric of the monitored computer system comprises one or more of the following: a server response time, a page latency, a CPU utilization, a system load, and a number of processing operations per unit time.

20. The system of claim 1, wherein the monitored computer system provides functionality for users to purchase items, and the metric of the monitored computer system comprises one or more of the following: an item order rate, an item price, and an item popularity.

21. A system for monitoring a monitored computer system, the monitoring system comprising:
   a data repository configured to store observation data for a metric of the monitored computer system; and
   computer hardware configured to execute an anomaly detection engine, the anomaly detection engine comprising:
      a forecasting component configured to determine a forecast for a time t+x from a time t of the metric of the monitored computer system, where x is a forecast time horizon, the forecasting component configured to:
         compute, based at least in part on the stored observation data, a seasonal adjustment factor for the time t+x and a seasonal adjustment factor for the time t, wherein at least one of the computed seasonal adjustment factors is computed from a plurality of seasonality factors such that the at least one computed seasonal adjustment factor is representative of a normal operating condition of the monitored computer system; and
         determine the forecast based at least in part on at least one of the computed seasonal adjustment factors.

22. The system of claim 21, further comprising a data acquisition component configured to receive data values related to the metric of the monitored computer system, the observation data stored by the data repository related to the received data values.

23. The system of claim 21, wherein the anomaly detection engine further comprises an anomaly detection component configured to:
   determine an expected range of observations of the metric of the monitored computer system, the expected range at least partially based on the forecast determined by the forecasting component;
   compare the observation data to the forecast or to the expected range of observations to determine whether there is an anomaly in the monitored computer system; and
   generate an alert or initiate a corrective action at least partially in response to the determination that there is an anomaly in the monitored computer system.

24. A system for monitoring a monitored computer system, the monitoring system comprising:
   a data repository configured to store observation data for a metric of the monitored computer system; and
   computer hardware configured to execute an anomaly detection engine, the anomaly detection engine comprising:
      a forecasting component configured to determine a forecast for a time t+x from a time t of the metric of the monitored computer system, where x is a forecast time horizon, the forecasting component configured to:
         generate a plurality of individual forecasts of the metric of the monitored computer system for the time t+x, where each of the plurality of individual forecasts is based on observation data ending earlier in time than the time t; and
         compute the forecast for the time t+x based at least in part on the plurality of individual forecasts; and
      an anomaly detection component configured to:
         determine the presence of an anomaly in the metric of the monitored computer system based at least in part on one or more of: (1) the observation data, (2) the forecast for the time t+x, and (3) an expected range of observations of the metric of the monitored computer system, the expected range at least partially based on the computed forecast for the time t+x; and
         generate an alert or initiate a corrective action at least partially in response to the determined presence of an anomaly in the monitored computer system.

25. The system of claim 24, wherein to generate at least some of the plurality of individual forecasts, the forecasting component is configured to:
   receive from the data repository a number of seasonality factors from prior seasons for the first time t, where a seasonality factor corresponds to a time that is an integer multiple of seasonal periods prior to the first time t;

deseasonalize the observation data at the time t using at least some of the collected seasonality factors;

compute a level component based at least in part on the deseasonalized observation data; and compute at least one individual forecast based at least in part on the level component and a second seasonal adjustment factor for the time t+x.

26. The system of claim 25, wherein to determine the second seasonal adjustment factor for the time t+x, the forecasting component is configured to:

receive from the data repository a number of second seasonality factors from prior seasons for the time t+x, where a second seasonality factor corresponds to a time that is an integer multiple of seasonal periods prior to the second time t+x; and determine the second seasonal adjustment factor using at least some of the second seasonality factors.

* * * * *